(12) United States Patent
Onggosanusi et al.

(10) Patent No.: US 9,680,535 B2
(45) Date of Patent: Jun. 13, 2017

(54) METHOD AND APPARATUS FOR REDUCED FEEDBACK FD-MIMO

(71) Applicant: Samsung Electronics Co., Ltd., Suwon-si, Gyeonggi-do (KR)

(72) Inventors: Eko Onggosanusi, Allen, TX (US); Md. Saifur Rahman, Richardson, TX (US); Young-Han Nam, Plano, TX (US); Yang Li, Plano, TX (US); Boon Loong Ng, Plano, TX (US)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 0 days.

(21) Appl. No.: 14/918,335

(22) Filed: Oct. 20, 2015

(65) Prior Publication Data

US 2016/0211895 A1 Jul. 21, 2016

Related U.S. Application Data

(60) Provisional application No. 62/104,551, filed on Jan. 16, 2015, provisional application No. 62/146,082, (Continued)

(51) Int. Cl.
*H04B 7/06* (2006.01)
*H04B 7/0404* (2017.01)
(Continued)

(52) U.S. Cl.
CPC ......... *H04B 7/0404* (2013.01); *H04B 7/0478* (2013.01); *H04B 7/0613* (2013.01); *H04B 7/0639* (2013.01); *H04L 25/03955* (2013.01)

(58) Field of Classification Search
CPC .. H04B 7/0404; H04B 7/0613; H04B 7/0639; H04B 7/0478; H04L 25/03955
See application file for complete search history.

(56) References Cited

U.S. PATENT DOCUMENTS

2009/0110114 A1* 4/2009 Onggosanusi ....... H04B 7/0417
375/299
2011/0149765 A1 6/2011 Gorokhov et al.
(Continued)

FOREIGN PATENT DOCUMENTS

EP 2863570 A1 4/2015
WO WO 2013/185320 A1 12/2013

OTHER PUBLICATIONS

PCT/CN2013/076735, Wu et al., filed on Jun. 4, 2013 (Parent applicaiton for US 2016/0087701).*
(Continued)

*Primary Examiner* — Siu Lee

(57) ABSTRACT

A method for operating a base station includes receiving an uplink signal from a user equipment (UE), wherein the uplink signal includes a precoding matrix indicator (PMI) associated with a first precoder index of a codebook determined by a first and a second precoder indices, and a channel quality indicator (CQI). The method includes applying an open-loop diversity operation to at least one data stream including quadrature amplitude modulation (QAM) symbols to generate N_B signal streams and applying a precoding matrix to the N_B signal streams to generate a larger number of N_TX data streams to be transmitted via a plurality of antennas.

8 Claims, 16 Drawing Sheets

Related U.S. Application Data filed on Apr. 10, 2015, provisional application No. 62/181,828, filed on Jun. 19, 2015.

(51) Int. Cl.
*H04B 7/04* (2017.01)
*H04L 25/03* (2006.01)

(56) References Cited

U.S. PATENT DOCUMENTS

| | | | |
|---|---|---|---|
| 2012/0140649 A1* | 6/2012 | Choudhury | H04W 24/10 370/252 |
| 2013/0182672 A1 | 7/2013 | Kakishima et al. | |
| 2013/0322361 A1* | 12/2013 | Ko | H04B 7/0632 370/329 |
| 2014/0301492 A1 | 10/2014 | Xin et al. | |
| 2015/0249511 A1* | 9/2015 | Chen | H04L 1/0026 370/252 |
| 2015/0295694 A1* | 10/2015 | Li | H04L 1/0026 370/329 |
| 2016/0065279 A1* | 3/2016 | Wang | H04L 5/0048 375/267 |
| 2016/0087701 A1* | 3/2016 | Wu | H04B 7/0417 375/267 |

OTHER PUBLICATIONS

International Search Report and Written Opinion dated May 16, 2016 in connection with International Application No. PCT/KR2016/000479, 10 pages.

Extended European Search Report dated Jun. 8, 2016 in connection with European Application No. 16151648.9, 12 pages.

Samsung, "Open-Loop Transmission Scheme for FD-MIMO", 3GPP TSG RAN WG1 Meeting #79, San Francisco, California, Nov. 17-21, 2014, R1-144757, 3 pages.

Osama N. Alrabadi, et al., "A Universal Encoding Scheme for MIMO Transmission Using a Single Active Element for PSK Modulation Schemes", IEEE Transaction on Wireless Communications, vol. 8, No. 10, Oct. 2009, 12 pages.

Young-Han Nam, et al., "Phase-Shift Cyclic-Delay Diversity for MIMO OFDM Systems", International Journal of Digital Multimedia Broadcasting, vol. 2010, Jan. 1, 2010, 5 pages.

\* cited by examiner

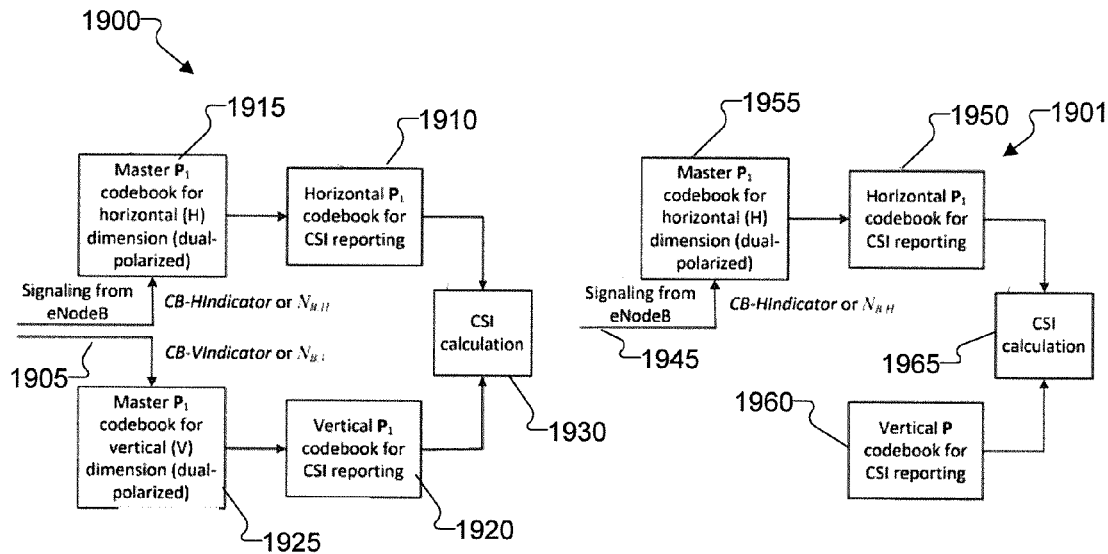
FIGURE 19A                    FIGURE 19B
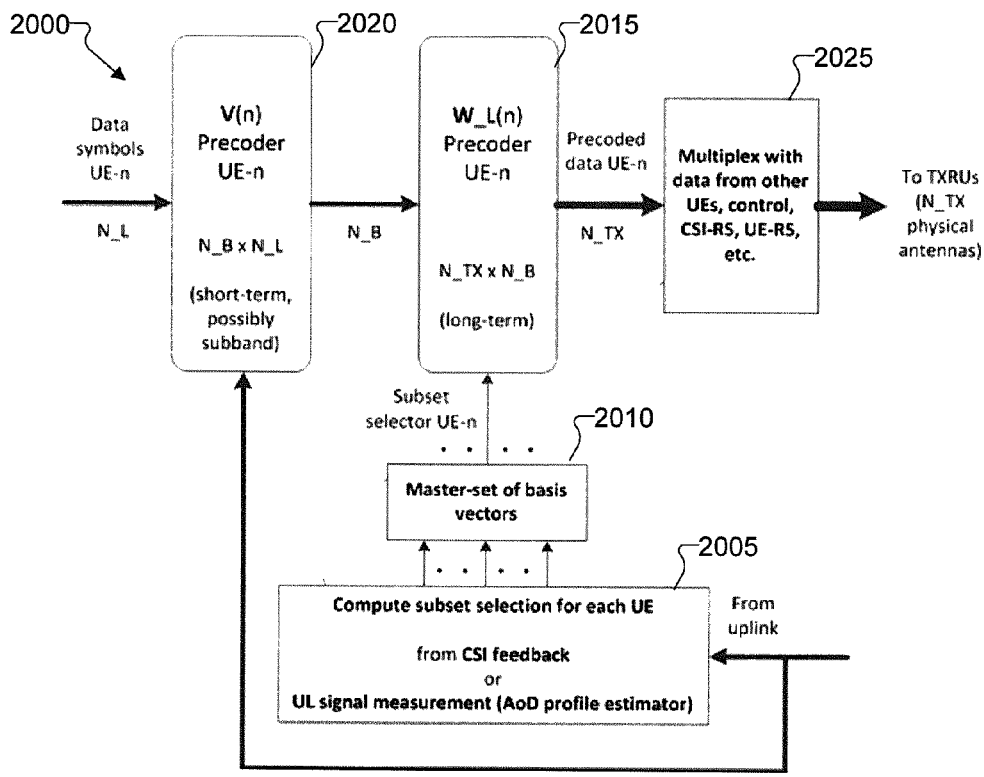
FIGURE 20

METHOD AND APPARATUS FOR REDUCED FEEDBACK FD-MIMO

CROSS-REFERENCE TO RELATED APPLICATION(S) AND CLAIM OF PRIORITY

The present application claims priority to U.S. Provisional Patent Application Ser. No. 62/146,082, filed on Apr. 10, 2015, entitled "Method and Apparatus for Reduced Feedback FD-MIMO", U.S. Provisional Patent Application Ser. No. 62/181,828, filed on Jun. 19, 2015, entitled "Method and Apparatus for Reduced Feedback FD-MIMO", and U.S. Provisional Patent Application Ser. No. 62/104,551, filed on Jan. 16, 2015, entitled "FD-MIMO with Reduced CSI Feedback." The content of the above-identified patent documents are incorporated herein by reference.

TECHNICAL FIELD

The present application relates generally to full-dimension multiple-input multiple-output (FD-MIMO) wireless communication systems. More specifically, this disclosure relates to an efficient feedback for FD-MIMO systems.

BACKGROUND

Given the spatial multiplexing provided by FD-MIMO systems, understanding and correctly estimating the channel between a user equipment (UE) and an eNode B (eNB) is important for efficient and effective wireless communication. In order to correctly estimate the channel conditions, the UE will feedback information about channel measurement, e.g., channel state information (CSI), to the eNB. With this information about the channel, the eNB is able to select appropriate communication parameters to efficiently and effectively perform wireless data communication with the UE. However, with increase in the numbers of antennas and channel paths of wireless communication devices, so too has the amount of feedback increased that may be needed to ideally estimate the channel. This additionally-desired channel feedback may create additional overheads, thus reducing the efficiency of the wireless communication, for example, decrease the data rate.

SUMMARY

Embodiments of the present disclosure provide an efficient feedback for FD-MIMO systems.

In one embodiment, a method for operating a base station is provided. The method comprises receiving an uplink signal from a user equipment (UE). The uplink signal includes a precoding matrix indicator (PMI) associated with a first precoder index of a codebook determined by a first and a second precoder indices, and a channel quality indicator (CQI). The method further comprises applying an open-loop diversity operation to at least one data stream including quadrature amplitude modulation (QAM) symbols to generate N_B signal streams, applying a precoding matrix to the N_B signal streams to generate a larger number of N_TX data streams to be transmitted via a plurality of antennas. An apparatus for performing this method is also provided.

In another embodiment, a method for operating a user equipment (UE). The method includes determining a precoding matrix indicator (PMI) associated with a first precoder index of a codebook determined by a first and a second precoder indices, calculating a channel quality indicator (CQI) in accordance with an open-loop operation and a precoding matrix associated with the PMI, and transmitting an uplink signal to a base station. The uplink signal includes the PMI and the CQI. An apparatus for performing this method is also provided.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 19A illustrates an example procedures of a channel status indicator (CSI) calculation utilizing a sub-codebook according to embodiments of the present disclosure;

FIG. 19B illustrates an example procedures of a channel status indicator (CSI) calculation utilizing a single vertical precoder according to embodiments of the present disclosure;

FIG. 20 illustrates an example block diagram of a data path according to embodiments of the present disclosure;

DETAILED DESCRIPTION

FIG. 1 through FIG. 23, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents and standards descriptions are hereby incorporated by reference into the present disclosure as if fully set forth herein: 3GPP TS 36.211 v12.4.0, "E-UTRA, Physical channels and modulation" (REF1); 3GPP TS 36.212 v12.3.0, "E-UTRA, Multiplexing and Channel coding" (REF2); 3GPP TS 36.213 v12.4.0, "E-UTRA, Physical Layer Procedures" (REF3); 3GPP TS 36.321 v12.4.0, "E-UTRA, Medium Access Control (MAC) protocol specification" (REF4); and 3GPP TS 36.331 v12.4.0, "E-UTRA, Radio Resource Control (RRC) protocol specification" (REF5).

Figure 1:
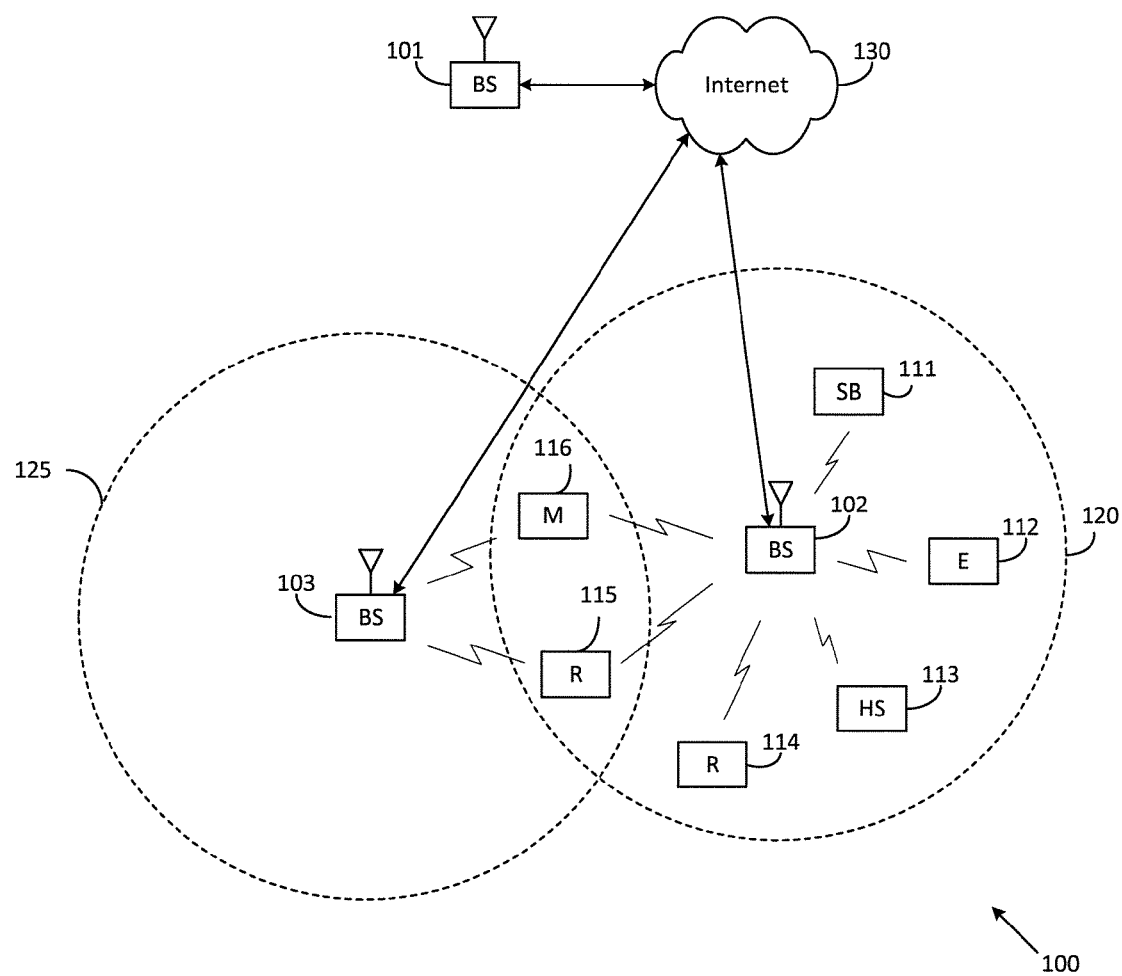
FIG. 1 illustrates an example wireless network according to embodiments of the present disclosure.
Figure 2:
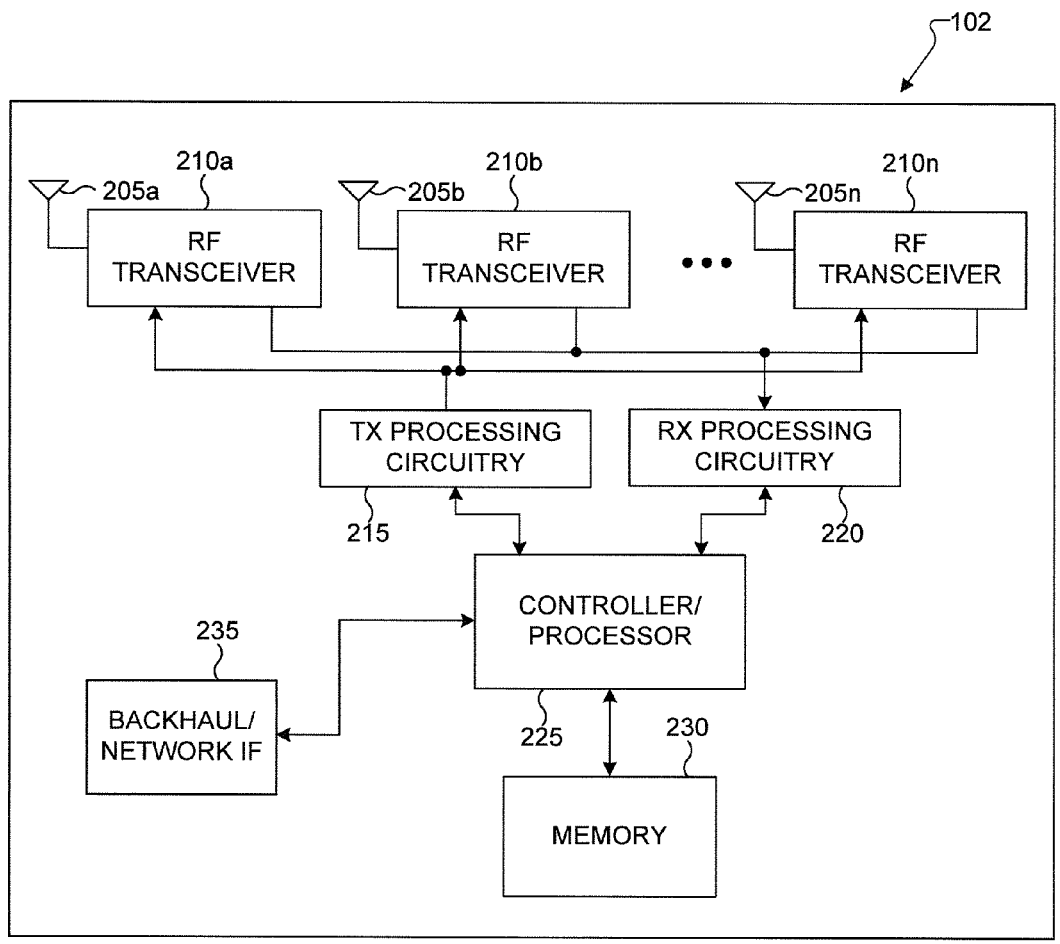
FIG. 2 illustrates an example eNB according to embodiments of the present disclosure.
Figure 3:
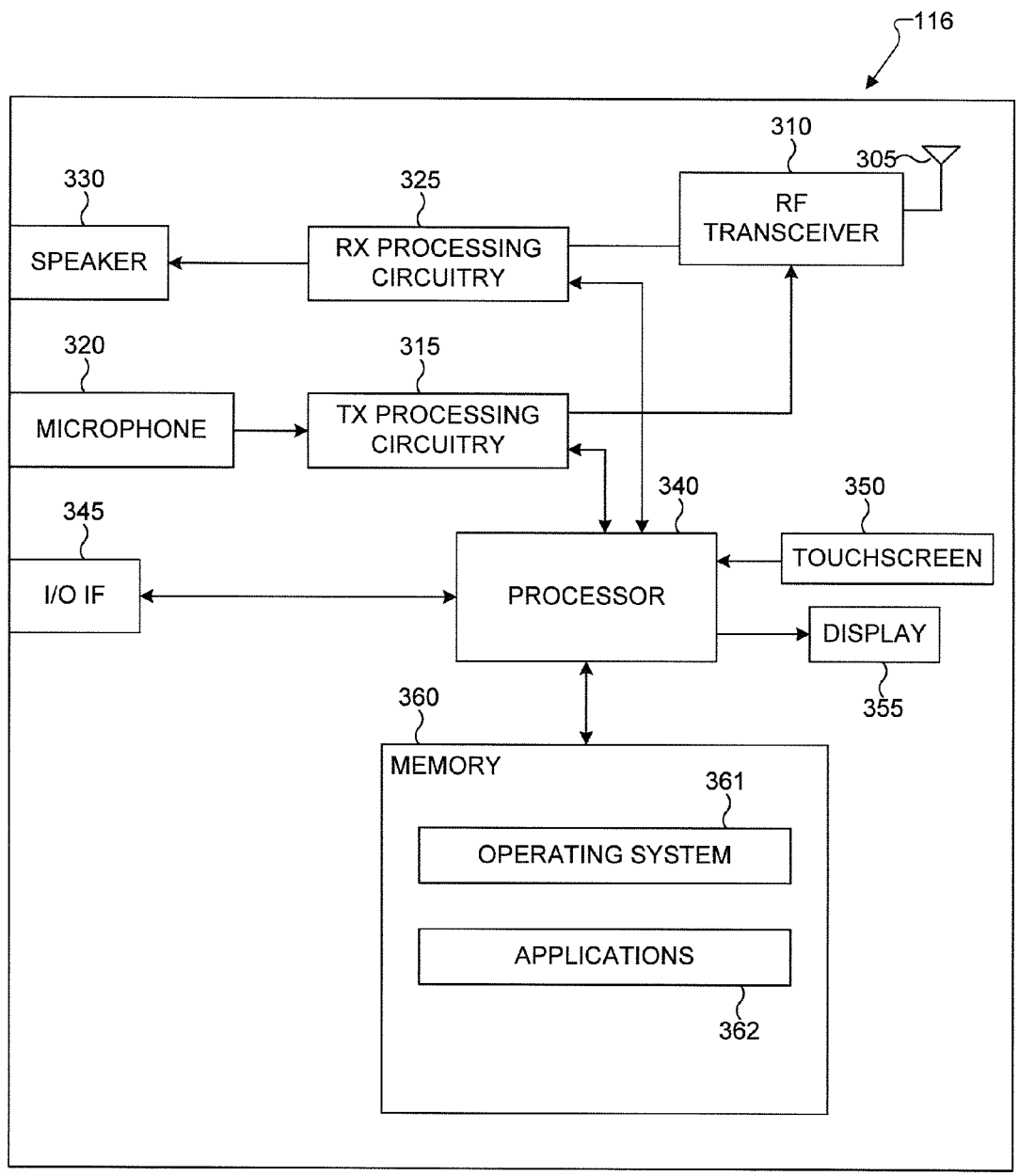
FIG. 3 illustrates an example UE according to embodiments of the present disclosure.

FIGS. 1-4B below describe various embodiments implemented in wireless communications systems and with the use of OFDM or OFDMA communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network 100 according to embodiments of the present disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNB 101, an eNB 102, and an eNB 103. The eNB 101 communicates with the eNB 102 and the eNB 103. The eNB 101 also communicates with at least one network 130, such as the Internet, a proprietary Internet Protocol (IP) network, or other data network.

The eNB 102 provides wireless broadband access to the network 130 for a first plurality of user equipments (UEs) within a coverage area 120 of the eNB 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 5G, LTE, LTE-A, WiMAX, WiFi, or other wireless communication techniques.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, one or more of the UEs 111-116 include circuitry, programming, or a combination thereof, for vector quantization of feedback components such as channel coefficients. In certain embodiments, and one or more of the eNBs 101-103 includes circuitry, programming, or a combination thereof, for processing of vector quantized feedback components such as channel coefficients.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNBs 101, 102, and/or 103 could provide access to other or additional external networks, such as external telephone networks or other types of data networks.

FIG. 2 illustrates an example eNB 102 according to embodiments of the present disclosure. The embodiment of the eNB 102 illustrated in FIG. 2 is for illustration only, and the eNBs 101 and 103 of FIG. 1 could have the same or similar configuration. However, eNBs come in a wide variety of configurations, and FIG. 2 does not limit the scope of this disclosure to any particular implementation of an eNB.

As shown in FIG. 2, the eNB 102 includes multiple antennas 205*a*-205*n*, multiple RF transceivers 210*a*-210*n*, transmit (TX) processing circuitry 215, and receive (RX) processing circuitry 220. The eNB 102 also includes a controller/processor 225, a memory 230, and a backhaul or network interface 235.

The RF transceivers 210*a*-210*n* receive, from the antennas 205*a*-205*n*, incoming RF signals, such as signals transmitted by UEs in the network 100. The RF transceivers 210*a*-210*n* down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210*a*-210*n* receive the outgoing processed baseband or IF signals from the TX processing circuitry 215 and up-converts the baseband or IF signals to RF signals that are transmitted via the antennas 205*a*-205*n*.

The controller/processor 225 can include one or more processors or other processing devices that control the overall operation of the eNB 102. For example, the controller/processor 225 could control the reception of forward channel signals and the transmission of reverse channel signals by the RF transceivers 210*a*-210*n*, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing signals from multiple antennas 205*a*-205*n* are weighted differently to effectively steer the outgoing signals in a desired direction. Any of a wide variety of other functions could be supported in the eNB 102 by the controller/processor 225. In some embodiments, the controller/processor 225 includes at least one microprocessor or microcontroller. As described in more detail below, the eNB 102 may include circuitry, programming, or a combination thereof for processing of vector quantized feedback components such as channel coefficients. For example, controller/processor 225 can be configured to execute one or more instructions, stored in memory 230, that are configured to cause the controller/processor to process vector quantized feedback components such as channel coefficients.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the eNB 102 to communicate with other devices or systems over a backhaul connection or over a network. The interface 235 could support communications over any suitable wired or wireless connection(s). For example, when the eNB 102 is implemented as part of a cellular communication system (such as one supporting 5G, LTE, or LTE-A), the interface 235 could allow the eNB 102 to communicate with other eNBs over a wired or wireless backhaul connection. When the eNB 102 is implemented as an access point, the interface 235 could allow the eNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of eNB 102, various changes may be made to FIG. 2. For example, the eNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the eNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for vector quantization of feedback components such as channel coefficients. The processor 340 can move data into or out of the memory 360 as required by an executing process. In some embodiments, the processor 340 is configured to execute the applications 362 based on the OS 361 or in response to signals received from eNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

Figure 4A:
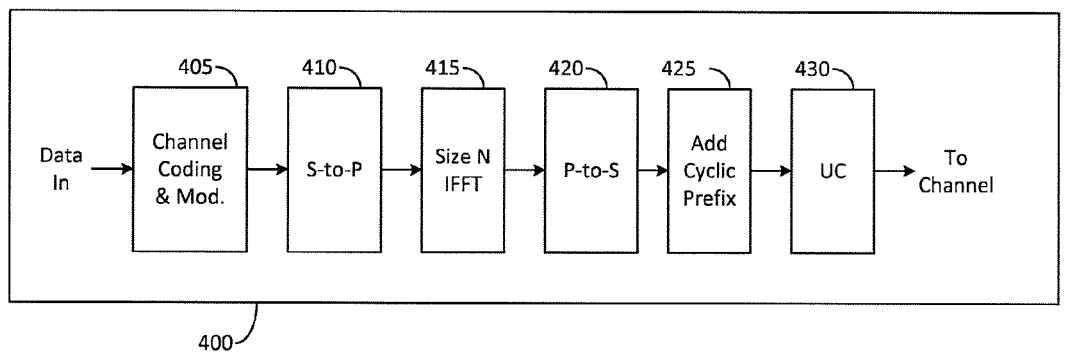
FIG. 4A illustrates a high-level diagram of an orthogonal frequency division multiple access transmit path according to embodiments of the present disclosure.
Figure 4B:
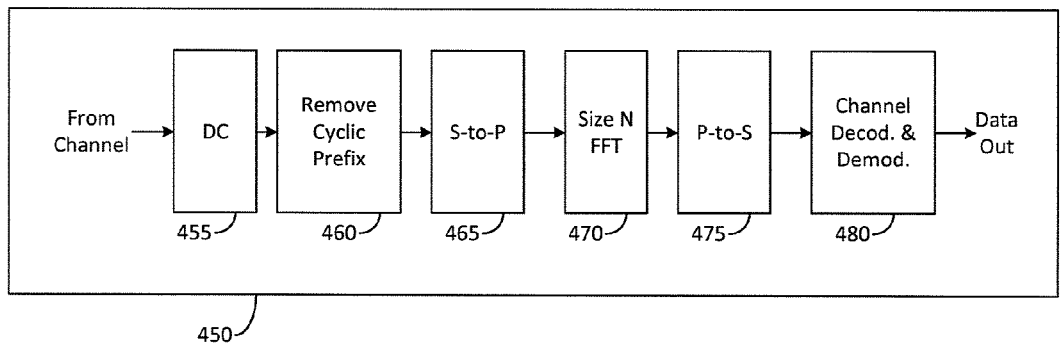
FIG. 4B illustrates a high-level diagram of an orthogonal frequency division multiple access receive path according to embodiments of the present disclosure.

FIG. 4A is a high-level diagram of transmit path circuitry 400. For example, the transmit path circuitry 400 may be used for an orthogonal frequency division multiple access (OFDMA) communication. FIG. 4B is a high-level diagram of receive path circuitry 450. For example, the receive path circuitry 450 may be used for an orthogonal frequency division multiple access (OFDMA) communication. In FIGS. 4A and 4B, for downlink communication, the transmit path circuitry 400 may be implemented in a base station (eNB) 102 or a relay station, and the receive path circuitry 450 may be implemented in a user equipment (e.g. user equipment 116 of FIG. 1). In other examples, for uplink communication, the receive path circuitry 450 may be implemented in a base station (e.g. eNB 102 of FIG. 1) or a relay station, and the transmit path circuitry 400 may be implemented in a user equipment (e.g. user equipment 116 of FIG. 1).

Transmit path circuitry 400 comprises channel coding and modulation block 405, serial-to-parallel (S-to-P) block 410, Size N Inverse Fast Fourier Transform (IFFT) block 415, parallel-to-serial (P-to-S) block 420, add cyclic prefix block 425, and up-converter (UC) 430. Receive path circuitry 450 comprises down-converter (DC) 455, remove cyclic prefix block 460, serial-to-parallel (S-to-P) block 465, Size N Fast Fourier Transform (FFT) block 470, parallel-to-serial (P-to-S) block 475, and channel decoding and demodulation block 480.

At least some of the components in FIGS. 4A and 4B may be implemented in software, while other components may be implemented by configurable hardware or a mixture of software and configurable hardware. In particular, it is noted that the FFT blocks and the IFFT blocks described in this disclosure document may be implemented as configurable software algorithms, where the value of Size N may be modified according to the implementation.

Furthermore, although this disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that for DFT and IDFT functions, the value of the N variable may be any integer number (i.e., 1, 4, 3, 4, etc.), while for FFT and IFFT functions, the value of the N variable may be any integer number that is a power of two (i.e., 1, 2, 4, 8, 16, etc.).

In transmit path circuitry 400, channel coding and modulation block 405 receives a set of information bits, applies coding (e.g., LDPC coding) and modulates (e.g., Quadrature Phase Shift Keying (QPSK) or Quadrature Amplitude Modulation (QAM)) the input bits to produce a sequence of frequency-domain modulation symbols. Serial-to-parallel block 410 converts (i.e., de-multiplexes) the serial modulated symbols to parallel data to produce N parallel symbol streams where N is the IFFT/FFT size used in BS 102 and UE 116. Size N IFFT block 415 then performs an IFFT operation on the N parallel symbol streams to produce time-domain output signals. Parallel-to-serial block 420 converts (i.e., multiplexes) the parallel time-domain output symbols from Size N IFFT block 415 to produce a serial time-domain signal. Add cyclic prefix block 425 then inserts a cyclic prefix to the time-domain signal. Finally, up-converter 430 modulates (i.e., up-converts) the output of add cyclic prefix block 425 to RF frequency for transmission via a wireless channel. The signal may also be filtered at baseband before conversion to RF frequency.

The transmitted RF signal arrives at UE 116 after passing through the wireless channel, and reverse operations to those at eNB 102 are performed. Down-converter 455 down-converts the received signal to baseband frequency, and remove cyclic prefix block 460 removes the cyclic prefix to produce the serial time-domain baseband signal. Serial-to-parallel block 465 converts the time-domain baseband signal to parallel time-domain signals. Size N FFT block 470 then performs an FFT algorithm to produce N parallel frequency-domain signals. Parallel-to-serial block 475 converts the parallel frequency-domain signals to a sequence of modulated data symbols. Channel decoding and demodulation block 480 demodulates and then decodes the modulated symbols to recover the original input data stream.

Each of eNBs 101-103 may implement a transmit path that is analogous to transmitting in the downlink to user equipment 111-116 and may implement a receive path that is analogous to receiving in the uplink from user equipment 111-116. Similarly, each one of user equipment 111-116 may implement a transmit path corresponding to the architecture for transmitting in the uplink to eNBs 101-103 and may implement a receive path corresponding to the architecture for receiving in the downlink from eNBs 101-103.

Various embodiments of the present disclosure provides for a high-performance, scalability with respect to the number and geometry of transmit antennas, and a flexible CSI feedback framework and structure for LTE enhancements when FD-MIMO with large two-dimensional antenna arrays is supported. To achieve high performance, more accurate CSI in terms MIMO channel is needed at the eNB especially for FDD scenarios. In this case, embodiments of the present disclosure recognize that the previous LTE (e.g. Rel.12) precoding framework (PMI-based feedback) may need to be replaced. In this disclosure, properties of FD-MIMO are factored in for the present disclosure. For example, the use of closely spaced large 2D antenna arrays that is primarily geared toward high beamforming gain rather than spatial multiplexing along with relatively small angular spread for each UE. Therefore, compression or dimensionality reduction of the channel feedback in accordance with a fixed set of basis functions and vectors may be achieved. In another example, updated channel feedback parameters (e.g., the channel angular spreads) may be obtained at low mobility using UE-specific higher-layer signaling. In addition, a CSI feedback may also be performed cumulatively.

Another embodiment of the present disclosure incorporates a CSI reporting method and procedure with a reduced PMI feedback. This PMI reporting at a lower rate pertains to long-term DL channel statistics and represents a choice of a group of precoding vectors recommended by a UE to an eNB. The present disclosure also includes a DL transmission method wherein an eNB transmits data to a UE over a plurality of beamforming vectors while utilizing an open-loop diversity scheme. Accordingly, the use of long-teem precoding ensures that open-loop transmit diversity is applied only across a limited number of ports (rather than all the ports available for FD-MIMO, e.g., 64). This avoids having to support excessively high dimension for open-loop transmit diversity that reduces CSI feedback overhead and improves robustness when CSI measurement quality is questionable.

Figure 5:
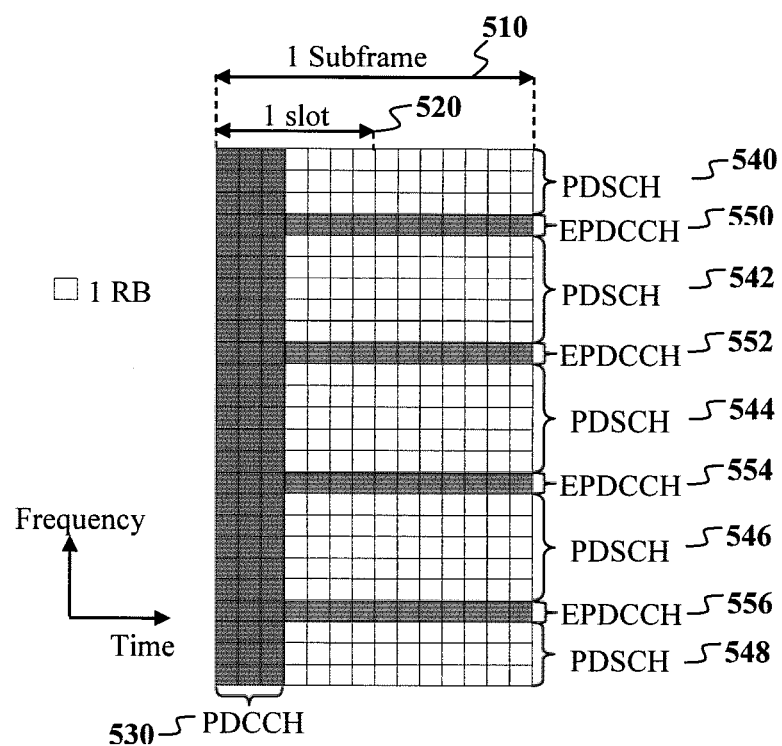
FIG. 5 illustrates an example structure for a downlink (DL) subframe according to embodiments of the present disclosure.

FIG. 5 illustrates an example structure for a DL subframe 500 according to embodiments of the present disclosure. An embodiment of the DL subframe structure 500 shown in FIG. 1 is for illustration only. Other embodiments may be used without departing from the scope of the present disclosure. The downlink subframe (DL SF) 510 includes two slots 520 and a total of $N_{symb}^{DL}$ symbols for transmitting of data information and downlink control information (DCI). The first $M_{symb}^{DL}$ SF symbols are used to transmit PDCCHs and other control channels 530 (not shown in FIG. 5). The remaining $N_{symb}^{DL}-M_{symb}^{DL}$ SF symbols are primarily used to transmit physical downlink shared channels (PDSCHs) 540, 542, 544, 546, and 548 or enhanced physical downlink control channels (EPDCCHs) 550, 552, 554, and 556. A transmission bandwidth (BW) comprises frequency resource units referred to as resource blocks (RBs). Each RB comprises either $N_{sc}^{RB}$ sub-carriers or resource elements (REs) (such as 12 Res). A unit of one RB over one subframe is referred to as a physical RB (PRB). A UE is allocated to $M_{PDSCH}$ RBs for a total of $M_{sc}^{PDSCH}=M_{PDSCH}N_{sc}^{RB}$ REs for a PDSCH transmission BW. An EPDCCH transmission is achieved in either one RB or multiple of RBs.

Figure 6:
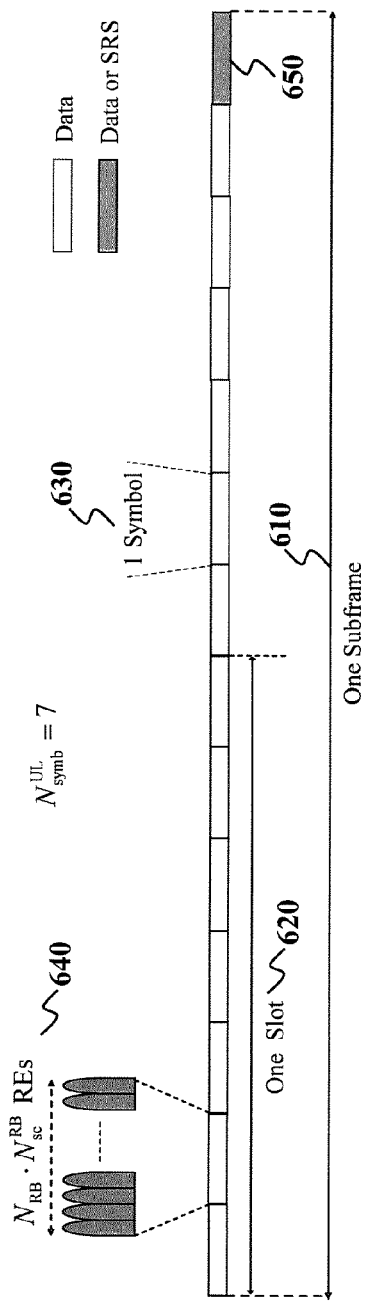
FIG. 6 illustrates an example transmission structure of an uplink (UL) subframe according to embodiments of the present disclosure.

FIG. 6 illustrates an example transmission structure of a physical uplink shared channel (PUSCH) subframe or a physical uplink control channel (PUCCH) subframe 600. Embodiments of the transmission structure for the PUSCH or the PUCCH over the UL subframe shown in FIG. 6 is for illustration only. Other embodiments could be used without departing from the scope of the present disclosure. A UL subframe 610 includes two slots. Each slot 620 includes $N_{symb}^{UL}$ symbols 630 for transmitting data information, uplink control information (UCI), demodulation reference signals (DMRS), or sounding RSs (SRSs). A frequency resource unit of an UL system BW is a RB. A UE is allocated to $N_{RB}$ RBs 640 for a total of $N_{RB} \cdot N_{sc}^{RB}$ resource elements (Res) for a transmission BW. For a PUCCH, $N_{RB}=1$. A last subframe symbol is used to multiplex SRS transmissions 650 from one or more UEs. A number of subframe symbols that are available for data/UCI/DMRS transmission is $N_{symb}=2 \cdot (N_{symb}^{UL}-1)-N_{SRS}$, where $N_{SRS}=1$ if a last subframe symbol is used to transmit SRS and $N_{SRS}=0$ otherwise.

Figure 7:
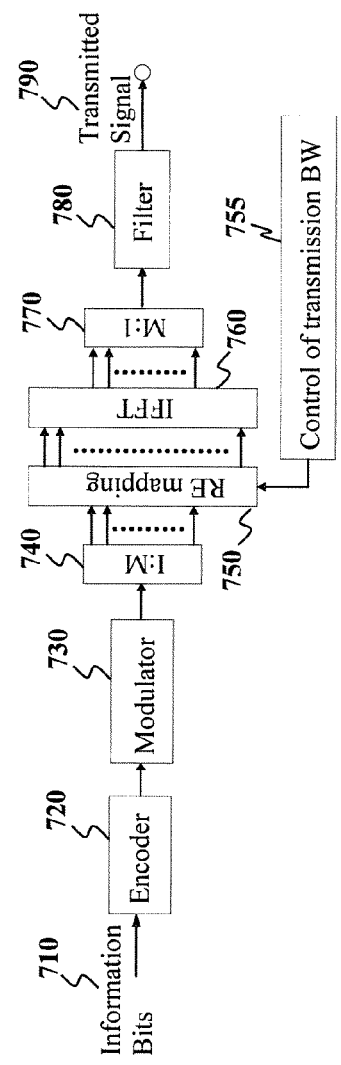
FIG. 7 illustrates an example transmitter block diagram for a physical downlink shared channel (PDSCH) subframe according to embodiments of the present disclosure.

FIG. 7 illustrates an example transmitter block diagram for a physical downlink shared channel (PDSCH) subframe 700 according to embodiments of the present disclosure. An embodiment of the PDSCH transmitter block diagram 700 shown in FIG. 7 is for illustration only. Other embodiments are used without departing from the scope of the present disclosure.

Information bits 710 are encoded by an encoder 720 (such as a turbo encoder) and modulated by a modulator 730, for example using a quadrature phase shift keying (QPSK) modulation. A Serial to Parallel (SIP) converter 740 generates M modulation symbols that are subsequently provided to a mapper 750 to be mapped to REs selected by a transmission BW selection unit 755 for an assigned PDSCH transmission BW, unit 760 applies an inverse fast fourier transform (IFFT). An output is then serialized by a parallel to a serial (P/S) converter 770 to create a time domain signal, filtering is applied by a filter 780, and then signal is transmitted. Additional functionalities, such as data scrambling, a cyclic prefix insertion, a time windowing, an interleaving, and others are well known in the art and are not shown for brevity.

Figure 8:
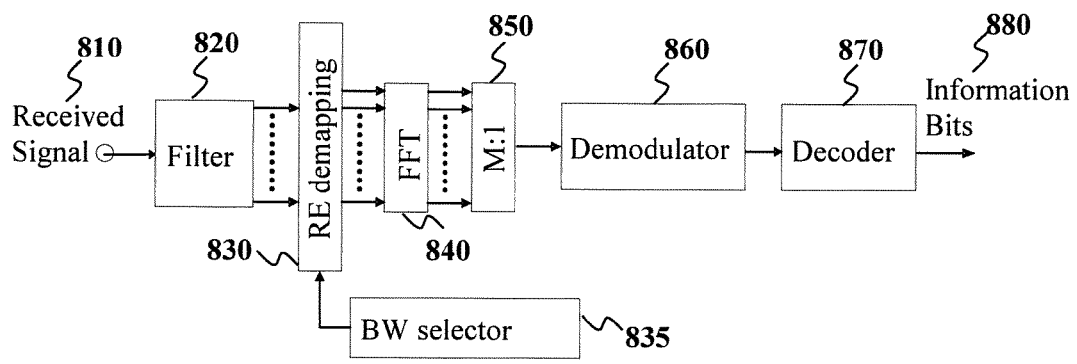
FIG. 8 illustrates an example receiver block diagram for a PDSCH subframe according to embodiments of the present disclosure.

FIG. 8 illustrates an example receiver block diagram for a PDSCH subframe 800 according to embodiments of the present disclosure. An embodiment of the PDSCH receiver block diagram 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions. Other embodiments can be used without departing from the scope of the present disclosure.

A received signal 810 is filtered by a filter 820, and then is output to an RE demapping block 830. The RE demapping 830 assigns a reception BW that is selected by a BW selector 835. The BW selector 835 is configured to control a transmission BW. A Fast Fourier Transform (FFT) circuit 840 applies a FFT. The output of the FFT circuitry 840 is serialized by a parallel-to-serial converter 850. Subsequently, a demodulator 860 coherently demodulates data symbols by applying a channel estimate obtained from a DMRS or a common reference signal (CRS) (not shown), and then a decoder 870 decodes demodulated data to provide an estimate of the information data bits 880. The decoder 870 can be configured to implement any decoding process, such as a turbo decoding process. Additional functionalities such as time-windowing, a cyclic prefix removal, a descrambling, a channel estimation, and a de-interleaving are not shown for brevity.

Figure 9:
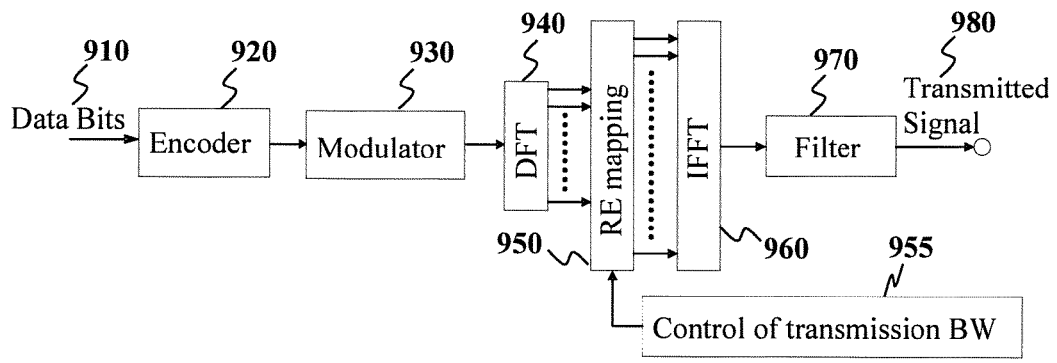
FIG. 9 illustrates an example transmitter block diagram for a physical uplink shared channel (PUSCH) subframe according to embodiments of the present disclosure.

FIG. 9 illustrates a transmitter block diagram for a physical uplink shared channel (PUSCH) subframe 900 according to embodiments of the present disclosure. One or more of the components illustrated in FIG. 9 can be implemented in specialized circuitry configured to perform the noted functions or one or more of the components can be implemented by one or more processors executing instructions to perform the noted functions. An embodiment of the PUSCH transmitter block diagram 900 shown in FIG. 9 is for illustration only. Other embodiments are used without departing from the scope of the present disclosure.

Information data bits 910 are encoded by an encoder 920 and modulated by a modulator 930. Encoder 920 can be configured to implement any encoding process, such as a turbo coding process. A discrete fourier transform (DFT) circuitry 940 applies a DFT on the modulated data bits. REs are mapped by an RE mapping circuit 950. The REs corresponding to an assigned PUSCH transmission BW are selected by a transmission BW selection unit 955. An inverse FFT (IFFT) circuit 960 applies an IFFT to the output of the RE mapping circuit 950. After a cyclic prefix insertion (not shown), filter 970 applies a filtering. The filtered signal then is transmitted.

Figure 10:
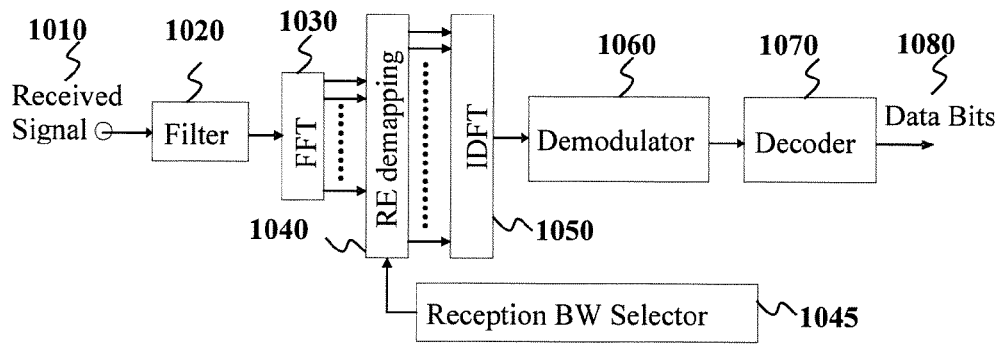
FIG. 10 illustrates an example receiver block diagram for a PUSCH in a subframe according to embodiments of the present disclosure.

FIG. 10 illustrates an example receiver block diagram for a PUSCH subframe 1000 according to embodiments of the present disclosure. An embodiment of the PUSCH receiver block diagram 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. Other embodiments are used without departing from the scope of the present disclosure.

A received signal 1010 is filtered by a filter 1020. Subsequently, after a cyclic prefix is removed (not shown), an FFT circuit 1030 applies an FFT. REs are mapped by an RE mapping circuit 1040. REs 1040 corresponding to an assigned PUSCH reception BW are selected by a reception BW selector 1045. An inverse DFT (IDFT) circuit 1050 applies an IDFT. Demodulator 1060 receives an output from IDFT circuit 1050 and coherently demodulates data symbols by applying a channel estimate obtained from a DMRS (not shown). A decoder 1070 decodes the demodulated data to provide an estimate of the information data bits 1080. The decoder 1070 can be configured to implement any decoding process, such as a turbo decoding process.

Figure 11:
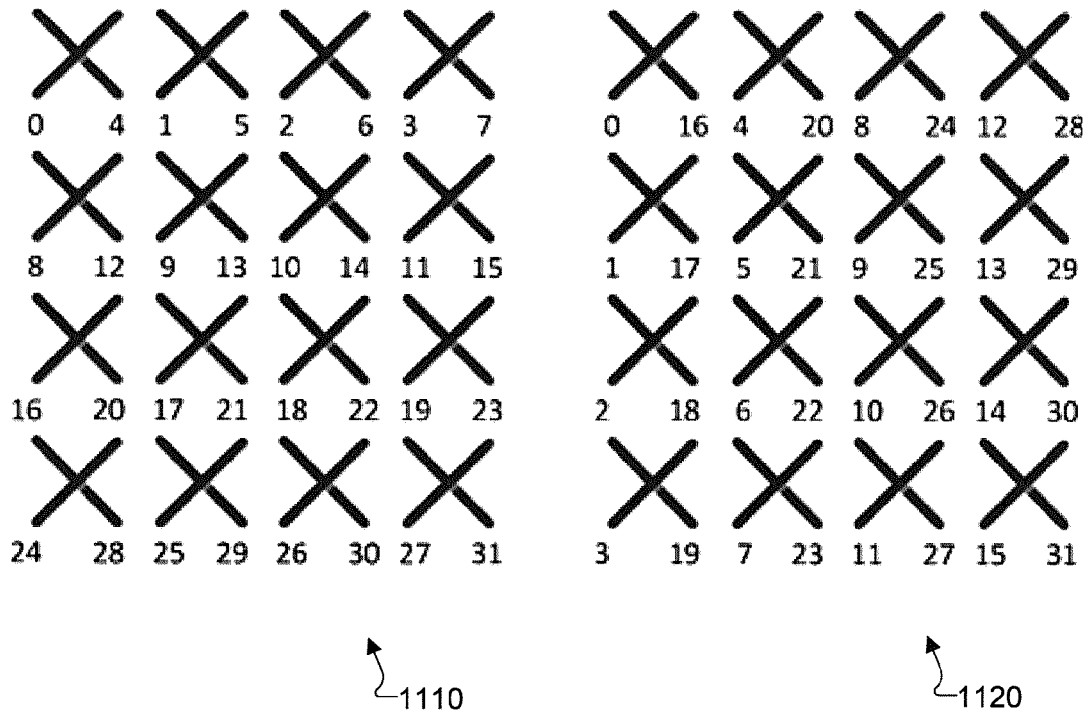
FIG. 11 illustrates an example configuration of a two dimensional (2D) array according to embodiments of the present disclosure.

FIG. 11 illustrates an example configuration of a two dimensional (2D) antenna array 1100 which is constructed from 16 dual-polarized antenna elements arranged in a 4×4 rectangular format according to embodiments of the present disclosure. In this illustration, each labelled antenna element is logically mapped onto a single antenna port. Two alternative labelling conventions are depicted for illustrative purposes (such as a horizontal first in 1110 and a vertical first in 1120). In one embodiment, one antenna port corresponds to multiple antenna elements (such as physical antennas) combined via a virtualization. This 4×4 dual polarized array is then viewed as 16×2=32-element array of elements. The vertical dimension (such as including 4 rows) facilitates an elevation beamforming in addition to an azimuthal beamforming across a horizontal dimension including 4 columns of dual polarized antennas. A MIMO precoding in Rel.12 LTE standardization was largely designed to offer a precoding gain for one-dimensional antenna array. While fixed beamforming (such as antenna virtualization) is implemented across an elevation dimension, it is unable to reap a potential gain offered by a spatial and frequency selective nature of channels.

In Rel.12 LTE, a MIMO precoding for a spatial multiplexing may be performed either with CRS or UE-specific RS. In either case, each UE operating in the spatial multiplexing mode(s) is configured to report a channel status indicator (CSI), which may contain a precoding matrix index (PMI). A PMI report is derived from two antenna ports, four antenna ports, or eight antenna ports. If the eNB 103 follows a PMI recommendation from the UE 116, the eNB 103 is expected to precode its transmitted signal according to a recommended precoding vector or matrix for a given subframe and RB. Regardless whether the eNB 103 follows this recommendation, the UE 116 is configured to report a PMI according to a configured precoding codebook. The PMI including a single index or a pair of indices is associated with a precoding matrix W of size $N_c \times N_L$, where $N_c$ is a number of antenna ports in one row (=number of columns) and $N_L$ is a number of transmission layers. It is assumed that only one row, therefore one dimensional array, is utilized.

TABLE 1 describes codebooks for a rank-1 and a rank-2 CSI reporting for UEs configured to receive 8-antenna-port transmissions. A particular codeword (such as a vector or a matrix) in the codebook is uniquely specified with two indices $i_1$ and $i_2$. To describe the two codebooks, the following two variables are defined:

$$\phi_n = e^{j\pi n/2}$$

$$v_m = [1\ e^{j2\pi m/32}\ e^{j4\pi m/32}\ e^{j6\pi m/32}]^T. \tag{1}$$

TABLE 1

| $i_1$ | $i_2$ | | | | |
|---|---|---|---|---|---|
| | 0 | 1 | 2 | 3 | 4 |
| 0-15 | $W_{2i_1,0}^{(1)}$ | $W_{2i_1,1}^{(1)}$ | $W_{2i_1,2}^{(1)}$ | $W_{2i_1,3}^{(1)}$ | $W_{2i_1+1,0}^{(1)}$ |

| $i_1$ | $i_2$ | | | | |
|---|---|---|---|---|---|
| | 5 | 6 | 7 | 8 | 9 |
| 0-15 | $W_{2i_1+1,1}^{(1)}$ | $W_{2i_1+1,2}^{(1)}$ | $W_{2i_1+1,3}^{(1)}$ | $W_{2i_1+2,0}^{(1)}$ | $W_{2i_1+2,1}^{(1)}$ |

| $i_1$ | $i_2$ | | |
|---|---|---|---|
| | 10 | 11 | 12 |
| 0-15 | $W_{2i_1+2,2}^{(1)}$ | $W_{2i_1+2,3}^{(1)}$ | $W_{2i_1+3,0}^{(1)}$ |

| $i_1$ | $i_2$ | | |
|---|---|---|---|
| | 13 | 14 | 15 |
| 0-15 | $W_{2i_1+3,1}^{(1)}$ | $W_{2i_1+3,2}^{(1)}$ | $W_{2i_1+3,3}^{(1)}$ | where $W_{m,n}^{(1)} = \frac{1}{\sqrt{8}} \begin{bmatrix} v_m \\ \varphi_n v_m \end{bmatrix}$, If the most recently reported rank indicator (RI) is 1, m and n are derived with the two indices $i_1$ and $i_2$ according to TABLE 1 which results in a rank-1 precoding vector:

$$W_{m,n}^{(1)} = \frac{1}{\sqrt{8}} \begin{bmatrix} v_m \\ \varphi_n v_m \end{bmatrix}. \tag{2}$$

TABLE 2

| $i_1$ | $i_2$ | |
|---|---|---|
| | 0 | 1 |
| 0-15 | $W_{2i_1,2i_1,0}^{(2)}$ | $W_{2i_1,2i_1,1}^{(2)}$ |
| | $i_2$ | |
| $i_1$ | 2 | 3 |
| 0-15 | $W_{2i_1+1,2i_1+1,0}^{(2)}$ | $W_{2i_1+1,2i_1+1,1}^{(2)}$ |
| | $i_2$ | |
| $i_1$ | 4 | 5 |
| 0-15 | $W_{2i_1+2,2i_1+2,0}^{(2)}$ | $W_{2i_1+2,2i_1+2,1}^{(2)}$ |
| | $i_2$ | |
| $i_1$ | 6 | 7 |
| 0-15 | $W_{2i_1+3,2i_1+3,0}^{(2)}$ | $W_{2i_1+3,2i_1+3,1}^{(2)}$ |
| | $i_2$ | |
| $i_1$ | 8 | 9 |
| 0-15 | $W_{2i_1,2i_1+1,0}^{(2)}$ | $W_{2i_1,2i_1+1,1}^{(2)}$ |
| | $i_2$ | |
| $i_1$ | 10 | 11 |
| 0-15 | $W_{2i_1+1,2i_1+2,0}^{(2)}$ | $W_{2i_1+1,2i_1+2,1}^{(2)}$ |
| | $i_2$ | |
| $i_1$ | 12 | 13 |
| 0-15 | $W_{2i_1,2i_1+3,0}^{(2)}$ | $W_{2i_1,2i_1+3,1}^{(2)}$ |
| | $i_2$ | |
| $i_1$ | 14 | 15 |
| 0-15 | $W_{2i_1+1,2i_1+3,0}^{(2)}$ | $W_{2i_1+1,2i_1+3,1}^{(2)}$ | where $W_{m,m',n}^{(2)} = \frac{1}{4} \begin{bmatrix} v_m & v_{m'} \\ \varphi_n v_m & -\varphi_n v_{m'} \end{bmatrix}$ If the most recently reported RI is 2, m, m' and n are derived with the two indices $i_1$ and $i_2$ according to Table 2 which results in a rank-2 precoding matrix $$W_{m,m',n}^{(2)} = \frac{1}{4} \begin{bmatrix} v_m & v_{m'} \\ \varphi_n v_m & -\varphi_n v_{m'} \end{bmatrix}.$$

Based on a similar dual-stage concept, the alternative 4-antenna-port codebook supported in Rel.12 LTE is described as follows:

$$\phi_n = e^{j\pi n/2}$$

$$\phi'_n = e^{j2\pi n/32}$$

$$v'_m = [1\ e^{j2\pi m/32}]^T \tag{3}$$

TABLE 3

| $i_1$ | $i_2$ | | | |
|---|---|---|---|---|
| | 0 | 1 | 2 | 3 |
| 0-15 | $W_{i_1,0}^{(1)}$ | $W_{i_1,8}^{(1)}$ | $W_{i_1,16}^{(1)}$ | $W_{i_1,24}^{(1)}$ |
| | 4 | 5 | 6 | 7 |
| 0-15 | $W_{i_1+8,2}^{(1)}$ | $W_{i_1+8,10}^{(1)}$ | $W_{i_1+8,18}^{(1)}$ | $W_{i_1+8,26}^{(1)}$ |
| | 8 | 9 | 10 | 11 |
| 0-15 | $W_{i_1+16,4}^{(1)}$ | $W_{i_1+16,12}^{(1)}$ | $W_{i_1+16,20}^{(1)}$ | $W_{i_1+16,28}^{(1)}$ |
| | 12 | 13 | 14 | 15 |
| 0-15 | $W_{i_1+24,6}^{(1)}$ | $W_{i_1+24,14}^{(1)}$ | $W_{i_1+24,22}^{(1)}$ | $W_{i_1+24,30}^{(1)}$ | where $W_{m,n}^{(1)} = \frac{1}{2}\begin{bmatrix} v_m' \\ \varphi_n' v_m' \end{bmatrix}$

TABLE 4

| $i_1$ | $i_2$ | | |
|---|---|---|---|
| | 0 | 1 | 2 |
| 0-15 | $W_{i_1,i_1,0}^{(2)}$ | $W_{i_1,i_1,1}^{(2)}$ | $W_{i_1+8,i_1+8,0}^{(2)}$ |
| | 3 | 4 | 5 |
| 0-15 | $W_{i_1+8,i_1+8,1}^{(2)}$ | $W_{i_1+16,i_1+16,0}^{(2)}$ | $W_{i_1+16,i_1+16,1}^{(2)}$ |
| | 6 | 7 | 8 |
| 0-15 | $W_{i_1+24,i_1+24,0}^{(2)}$ | $W_{i_1+24,i_1+24,1}^{(2)}$ | $W_{i_1,i_1+8,0}^{(2)}$ |
| | 9 | 10 | 11 |
| 0-15 | $W_{i_1,i_1+8,1}^{(2)}$ | $W_{i_1,i_1+16,0}^{(2)}$ | $W_{i_1,i_1+16,1}^{(2)}$ |
| | 12 | | 13 |
| 0-15 | $W_{i_1,i_1+24,0}^{(2)}$ | | $W_{i_1,i_1+24,1}^{(2)}$ |
| | 14 | | 15 |
| 0-15 | $W_{i_1+8,i_1+24,0}^{(2)}$ | | $W_{i_1+8,i_1+24,1}^{(2)}$ | where $W_{m,m',n}^{(2)} = \frac{1}{\sqrt{8}}\begin{bmatrix} v_m' & v_{m'}' \\ \varphi_n' v_m' & -\varphi_n' v_{m'}' \end{bmatrix}$ For an FD-MIMO including a 2D antenna array, a 2D precoding is utilized and the need for a high-performance, scalable, and flexible CSI reporting mechanism is necessary. To achieve high performance, an accurate CSI is needed at the eNB. This is especially the case for frequency division duplexing (FDD) scenarios where short-term channel reciprocity is infeasible. However, designing a CSI reporting mechanism which attains high accuracy with a reasonably low feedback overhead is challenging as more antenna elements are utilized. Especially relevant is an ability to adapt to changes in long-term channel statistics including a DL angle of departure (AoD) profile which is characterized by one or a plurality of AoD clusters, each being characterized with one AoD value and its associated angular spread. Unlike short-term channel coefficients, under certain circumstances it is possible to measure DL long-term channel statistics at the eNB even for FDD. Provided that a UL-DL duplex distance is not too large, a UL-DL long-term reciprocity holds and allows the eNB to measure the DL AoD profile from uplink signals. If, for some reason, such a measurement scheme is infeasible, a low-rate CSI reporting which contains an indication of the DL AoD profile is an alternative venue.

Figure 12:
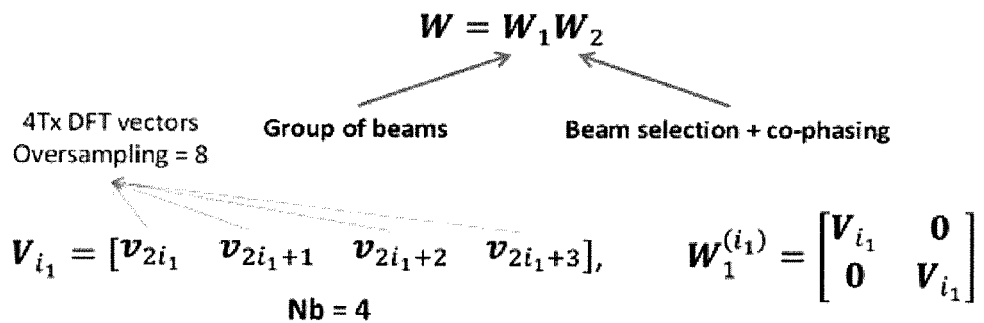
FIG. 12 illustrates an example configuration of an equivalent dual-stage representation according to embodiments of the present disclosure.

FIG. 12 illustrates an example configuration of an equivalent dual-stage representation 1200 of the 8-port rank-1 codebook given in TABLE 1. For a given value of $i_1$ and $i_2$, a resultant precoder W is a product of two matrices $W_1$ and $W_2$. The first matrix $W_1$ represents a group of $N_b$ length-4 DFT vectors for each of two polarizations. For rank-1 precoding, the second matrix (such as a vector in case of rank-1) $W_2$ selects one of the $N_b$ beams per polarization group and performs co-phasing between two polarizations. In this case, $N_b$ is fixed to be 4.

Figure 13:
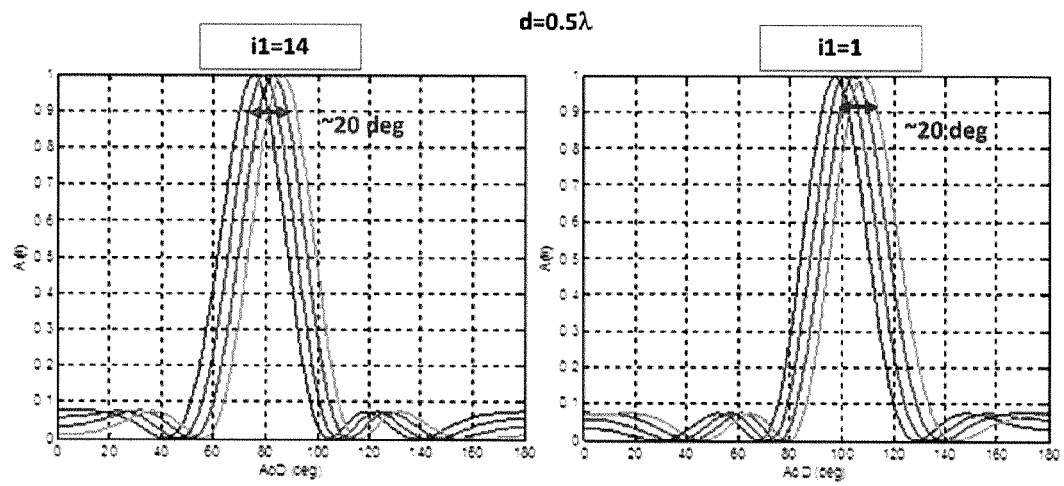
FIG. 13 illustrates an example magnitude of an array response profile according to embodiments of the present disclosure.

FIG. 13 illustrates an exemplary magnitude of an array response profile 1300 of the first four out of eight antenna ports (such as one polarization group) generated by four precoding vectors from a codebook of Rel.12 LTE specification. For illustrative purposes, these four vectors are specified by $i_1=14$ and 1, each with $i_2=0$, 4, 8, and 12 as described in TABLE 1. An identical array response, measured in magnitude, is obtained when $i_2=k$, k+4, k+8, and k+12 (e.g., k=1, 2, or 3). As evident, a given value of $i_1$, an indicator of long-term channel statistics, represents a group of four beams which span a fixed AoD spread of 20 degrees from which UE 116 selects one beam and applies co-phasing indicated by a value of $i_2$. As the value of $i_1$ is varied, a different range of AoD values is covered yet the spread remains the same. The same design principle is used in TABLE 2, 3, and 4. It is evident, therefore, that Rel.12 LTE codebooks lack a capability to adapt to changes in an AoD spread. Such a capability becomes more crucial for an FD-MIMO which employs a large number of antenna ports beyond Rel.12 LTE not only from DL performance perspective, but also in terms of UL feedback efficiency.

For an FD-MIMO, a precoding matrix (such as a precoder), which is used by an eNB to perform fast (such as short-term) precoding for transmitting to a UE and assumed by a UE to derive a CSI report, is described as $$P = P_1 P_2 \qquad (4)$$

Assuming that a total number of transmit antennas at the eNB 103 is $N_{TX}$ and a transmission rank or a number of layers for a spatial multiplexing is $N_L$, a size of the precoding matrix P is $N_{TX} \times N_L$. For a dual-polarized array with $N_r$ rows and $N_c$ columns illustrated in FIG. 11, the number of transmit antennas is $N_{TX}=2N_rN_c$. Here $P_1$ pertains to a long-term component. Therefore it is associated with long-term channel statistics such as the aforementioned AoD profile and AoD spread. Alternatively, $P_2$ pertains to a short-term component which performs selection, co-phasing, or any linear operation to the first component $P_1$. The precoder $P_2$, therefore, performs a linear transformation of the long-term component such as a linear combination of a set of basis functions or vectors associated with the column vectors of $P_1$. The number of columns of $P_1$ or the number of rows of $P_2$ corresponds to the size of the set of basis functions which is denoted as $N_B$. In terms of the description in FIG. 12, the number of basis functions $N_B$ is equal to $2N_b$.

From a perspective of a CSI feedback, UE 116 assumes a same long-term precoder component $P_1$ for all sub-bands (such as wideband precoding). The short-term component $P_2$, on the other hand, is computed for each sub-band (such as sub-band precoding) as an alternative to a wideband precoding report. The UE reports a PMI corresponding to $P_1$ and another PMI corresponding to $P_2$. Since the long-term wideband component of the precoder tends to vary slower, the PMI corresponding to $P_1$ is reported at a rate lower or at most the same as the PMI corresponding to $P_2$.

The Rel.12 LTE codebooks in TABLE 1, 2, 3, and 4 (and the associated codebooks for other ranks in REF3) are described in the same manner. Each of those codebooks is designed for a one-dimensional (1D) precoding. For FD-MIMO utilizing two-dimensional array, however, a two-dimensional (2D) precoding is employed where a precoder P is written as a Kronecker product of two precoders each for one of the two dimensions. Following a port indexing scheme in the embodiment 1110 of FIG. 11, this product precoder is described as $$P=(P_{1,H}P_{2,H})\otimes(P_{1,V}P_{2,V})=(P_{1,H}\otimes P_{1,V})(P_{2,H}\otimes P_{2,V}) \quad (5).$$

H and V denote a horizontal dimension and a vertical dimension, respectively. The first representation implies that the overall precoder P is constructed into horizontal and vertical components via Kronecker product. The second representation implies that each of the long-term and short-term precoders is constructed with a horizontal precoder and a vertical precoder via Kronecker product. Therefore, this present disclosure constructs a 2D precoding codebook from two 1D precoding codebooks in accordance with the above description. Each code-word in a 2D codebook is constructed according to equation (2). For example, a precoding codebook for FD-MIMO employing a 4×4 dual-polarized array (such as $N_r=4$, $N_c=4$, $N_{TX}=32$) depicted in embodiment 1110 of FIG. 11 is constructed via Kronecker product from a 4-port single-polarized codebook for the vertical dimension and an 8-port dual-polarized codebook for the horizontal dimension.

If a port indexing scheme in the embodiment 1100 of FIG. 11 is followed, the description in equation (2) is rewritten as $$P=(P_{1,V}P_{2,V})\otimes(P_{1,H}P_{2,H})=(P_{1,V}\otimes P_{1,H})(P_{2,V}\otimes P_{2,H}) \quad (6).$$

Compared to equation (2), equation (3) simply swaps H and V in its description. Codebook constructions assuming this port indexing scheme are obvious extensions of those assuming the port indexing scheme in embodiment 1110. Alternatively, the Kronecker structure is applied only to the first precoding stage while the second precoding stage performs a linear transformation to the first-stage precoding matrix. In that case, the product precoder is described as follows:

$$P=(P_{1,H}\otimes P_{1,V})P_2 \text{ (indexing in embodiment 1110)}$$

$$P=(P_{1,V}\otimes P_{1,H})P_2 \text{ (indexing in embodiment 1110)} \quad (6B)$$

Analogous to the description in FIG. 12, the number of basis functions $N_B$ is equal to $2N_{b,V}N_{b,H}$.

In various embodiments, a reliable CSI reporting is unattainable at eNB 103. For instance, when the UE 116 moves at a high mobility speed or inter-cell interference is bursty due to a lack of efficient inter-cell interference coordination, a CSI feedback from the UE 116 quickly becomes obsolete at the eNB 103. In such circumstances, a fully closed-loop solution that relies on a fast UE feedback and a high-resolution beamforming/precoding incurs a large system performance loss. The loss is amplified when larger antenna arrays (such as 2D arrays in FD-MIMO) are employed. Although a short-term precoding tends to result in performance loss under those scenarios, a long-term precoding, defined as one of which associated PMI is reported at a lower rate from a UE 116 to an eNB 103, allows greater stability and predictability. This holds when a PMI feedback associated with the long-term precoding conveys precoding subspace information which is correlated to long-teen DL channel statistics. Here, a precoding subspace refers to a group or a range of possible precoding vectors in contrast to a choice of precoding vector.

Figure 14:
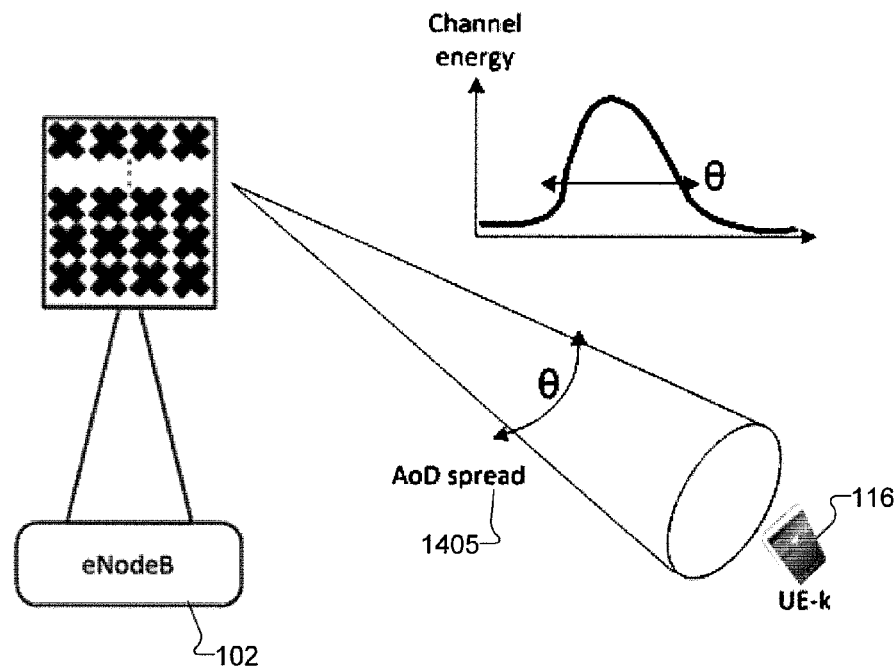
FIG. 14 illustrates an example diagram of a full-dimension multiple-input multiple-output (FD-MIMO) operation according to embodiments of the present disclosure.

FIG. 14 illustrates an example diagram of typical FD-MIMO operation scenario 1400 where a long-term DL channel multi-path profile between an eNB 103 and a UE 116 is contained within a range of DL AoD spread 1405 according to the present disclosure. If a reliable estimate of this long-term statistics is accessible at the eNB 103, the eNB 103 contains its transmission to the UE 116 within a range of DL AoDs 1405 where channel energy is substantial. In other words, rather than transmitting data along a particular beam associated with a single precoding vector, the eNB 103 transmits across a plurality of beams. When CSI feedback impairments are severe, this approach is expected to be more robust that the one requiring short-term CSI feedback. Therefore, there is a need to design a reduced feedback MIMO method, especially for but not limited to FD-MIMO, which primarily relies on a slower or a long-term PMI feedback. For example, there is a need to design codebooks which facilitate a reduced feedback operation and to define CSI reporting procedures and types including a channel quality indicator (CQI), a rank indicator (RI), a precoding matrix indicator (PMI), and a combination of thereof associated with the reduced feedback method.

Following the description given in equations (4), (5), and (6), along with their interpretation, this disclosure constructs a DL transmission method, along with its accompanying DL and UL signaling methods, for 2D dual-polarized rectangular antenna arrays with $N_r$ rows and $N_c$ columns from a Kronecker product between a transmission scheme for a 1D dual-polarized array with $N_c$ dual-polarized elements (such as $2N_c$ antenna elements representing a horizontal dimension) and a transmission scheme for a 1D single-polarized codebook with $N_r$ single-polarized elements (such as $N_r$ antenna elements representing a vertical dimension). Therefore, it follows that the transmission scheme that is able to accommodate different sizes of 2D antenna array is derived from 1D transmission schemes (such as some for single-polarized antenna array and other for dual-polarized antenna array) that are able to accommodate various values of $N_r$ and $N_c$.

Although horizontal is associated with a dual-polarized antenna array and vertical with a single-polarized antenna array in this disclosure, this association is exemplary. In one embodiment, horizontal is associated with a single-polarized array and vertical with a dual-polarized array is equally applicable as well.

Based on the above observation, embodiments of this disclosure describe transmission methods for a 1D dual-polarized array with AT, dual-polarized elements (such as $2N_c$ antennas) and a 1D single-polarized array with $N_r$ single-polarized elements (such as $N_r$ antennas). From these methods, a host of transmission methods for a 2D dual-polarized antenna array with $N_c$ columns and $N_r$ rows is constructed according to the description given in equations (4), (5), and (6).

Figure 15:
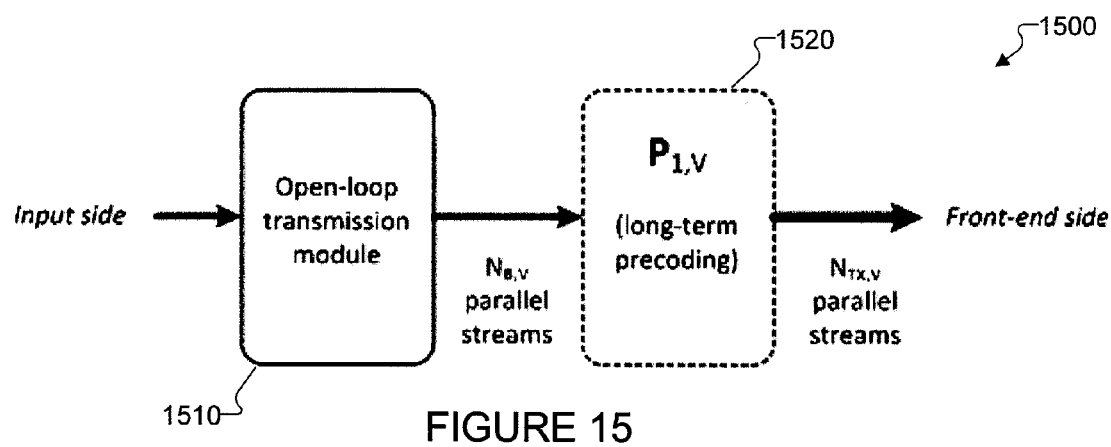
FIG. 15 illustrates an example transmission method including an open-loop transmission module according to embodiments of the present disclosure.

FIG. 15 illustrates an exemplary transmission method 1500 including an open-loop transmission module 1510. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chains in, for example, an eNB or a UE.

From a front-end side, a dynamic precoding module $P_{1,V}$ 1520 is utilized to precode $N_{b,V}$ parallel signal streams into $N_{TX,V}$ parallel signal streams where each of the $N_{TX,V}$ parallel streams is mapped onto one TXRU (such as antenna) port. In this case, $N_{TX,V} \leq N_r$ as represents a number of TXRU ports in a vertical dimension. The parameter $N_{b,V}$ denotes a number of precoding vectors or beams across which data transmission is performed. From an input side, an open-loop transmission module 1510 operates upon its input to generate $N_{b,V}$ parallel streams which serve as inputs to the dynamic precoding module 1520. Following the description given in equations (4), (5), and (6), along with their interpretation, the open-loop transmission module 1510 replaces a short-term precoding module $P_{2,V}$. Therefore, the present disclosure utilizes a long-term precoding $P_{1,V}$ along with an open-loop operation. For a transmission to a particular UE, such as UE 116, the same precoder is applied across all RBs assigned to it (such as a wideband precoder). As illustrated in FIG. 11, a shape of an open-loop transmission module is determined by either a transmission rank or a number of transmission layers for spatial multiplexing v and a number of its parallel output streams $N_{b,V}$. A shape of dynamic precoding module, on the other hand, is determined by a number of its parallel input streams $N_{b,V}$ and the number of TXRU (antenna) ports.

Various possibilities exist for an open-loop transmission module such as a frequency-switched beam diversity or a precoder cycling, a space-frequency block coding, and a cyclic delay diversity. The following embodiment describes an open-loop transmission method that utilizes a frequency-switched beam diversity for a rank v=1 and a v=2. In certain embodiments, this design is extended for higher transmission ranks. These embodiments apply to any value of $N_{b,V}$ such as $N_{b,V}=1$, 2 and 4. The special case of $N_{b,V}=1$ corresponds to a diversity order of 1 (such as no diversity gain).

For a given $N_{b,V}$ beams generated by the $N_{b,V}$ column vectors in $P_{1,V}$, eNB 103 performs beam switching/cycling across frequency across sub-carriers/REs, RBs, or sub-bands. Here, a cycling is performed for each of the $v_V$ transmission layers. A cycling pattern is based on a predetermined sequence or pattern. When the cycling is performed across sub-carriers or REs, the corresponding open-loop transmission scheme is described as a precoding matrix $C_V(\lambda, i)$ which is a function of transmission layer $\lambda (\lambda \in \{0, 1, \ldots, \max(v)-1\})$ and an RE index i. Therefore, $P_V(\lambda, i) = P_{1,V} C_V(\lambda, i)$ is a composite precoder (such as analogous to (1)) associated with a layer $\lambda (\lambda \in \{1, 2, \ldots, \max(v_V)\})$ and the RE index i.

The following cycling pattern embodiment and its associated $C_{\lambda,i}$ matrix are used. This pattern is defined for a given layer $\lambda$. An index parameter $I_{\lambda,i}$ is a precoding vector index for a transmission layer $\lambda$ and an RE index i which is defined starting from 0 and ending at $N_{b,V}-1$. $I_{\lambda,i}=\mod(i+\Delta_\lambda, N_{b,V})$, i=0, 1, . . . . $C_V(\lambda,i) = e_{I_{\lambda,i}} = [0 \ldots 0 \ 1 \ 0 \ldots 0]^T$ (such as length-$N_{b,V}$ column vector, only its $(I_{\lambda,i}-1)$-th element is non-zero), where $\Delta_\lambda$ denotes a layer-specific index shift which avoids precoder overlap across different transmission layers. In effect, this pattern performs cycling across $N_{b,V}$ different precoders as the RE index i is increased.

In certain embodiments for $I_{\lambda,i}$ with the same description of $C_V(\lambda, i)$ is given in equation below. Here cycling is performed in a unit of $v_V$ REs rather than every RE.

$$I_{\lambda,i} = \mod\left(\left\lfloor \frac{i}{v_V} \right\rfloor + \Delta_\lambda, N_{b,V}\right)+, i = 0, 1, \ldots .$$

A precoder cycling is also performed across fractions of one RB each of which consists of a plurality of REs or across RBs. The RE index i that is mapped onto resource element (such as RE) position (k, l) on an antenna port not reserved for other purposes is in increasing order of the first index k corresponding to a frequency sub-carrier over the assigned physical resource blocks and then the index/corresponding to an OFDM symbol, starting with the first slot in a subframe.

To support MU-MIMO, a set of cycling patterns $\{I_{\lambda,i}, \lambda=0, 1, \ldots, \max(v)-1\}$ is made UE-specific. In certain embodiments, UE-specific index shift parameters $\{\Delta_\lambda, \lambda=0, 1, \ldots, \max(v)-1\}$ are assigned to UE 116 either implicitly or explicitly. For example, the implicit assignment is to link the shift parameters with a UE-ID (such as UE RNTI for PDSCH). In another example, an explicit signaling from a serving eNB 103 to the UE 116 is performed to assign explicit assignment using either via a higher-layer (RRC) signaling or a DL assignment (such as a part of downlink control information (DCI) field).

Figure 16:
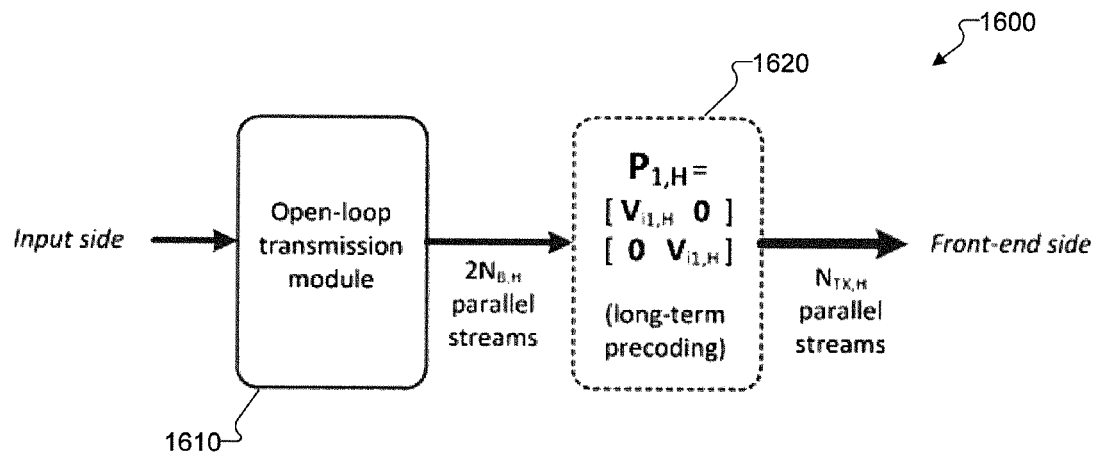
FIG. 16 illustrates another example transmission method including an open-loop transmission module according to embodiments of the present disclosure.

FIG. 16 illustrates a block diagram of transmission method 1600 that includes an open-loop transmission module 1610 and a dynamic precoding module 1620. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chains in, for example, an eNB or a UE.

From a front-end side, a dynamic precoding 1620 module $P_{1,H}$ is utilized to precode $2N_{b,H}$ parallel signal streams (such as $N_{b,H}$ parallel signal streams per polarization group as an input to $V_{1,H}$) into $N_{TX,H}$ parallel signal streams where each of the $N_{TX,H}$ parallel streams is mapped onto one TXRU (such as antenna) port. In this case, $N_{TX,H} \leq N_r$ represents the number of TXRU ports in the horizontal dimension. A parameter $N_{b,H}$ denotes a number of precoding vectors or beams per polarization group across which data transmission is performed. From an input side, the open-loop transmission module 1610 operates upon its input to generate $2N_{b,H}$ parallel streams, which serve as inputs to the dynamic precoding module 1620. Following the description given in equations (4), (5), and (6), along with their interpretation, the open-loop transmission module 1610 replaces a short-term precoding module $P_{2,H}$. Therefore, embodiments of the disclosure utilize the long-term precoding $P_{1,H}$ along with the open-loop transmission operation. For a transmission to a particular UE, such as UE 116, the same precoder is applied across all RBs assigned to it (such as a wideband precoder).

As illustrated in FIG. 16, a shape of open-loop transmission module is determined by a transmission rank, or a number of transmission layers for spatial multiplexing v and a number of its parallel output streams per polarization group $N_{b,H}$. In certain embodiments, a shape of open-loop transmission module is determined by a number of transmission layers for a spatial multiplexing. A shape of dynamic precoding module, on the other hand, is determined by a number of its parallel input streams $N_{b,H}$ and a number of TXRU (such as antenna) ports.

In certain embodiments, the open-loop transmission module 1610 utilizes a frequency-switched beam diversity for rank v=1 and v=2. In certain embodiments, the open-loop transmission module 1610 utilizing a frequency-switched beam diversity is extended for higher transmission ranks. In certain embodiment, the open-loop transmission module 1610 utilizes a precoder cycling, a space-frequency block coding, and/or a cyclic delay diversity. These exemplary embodiments apply to any value of $N_{b,H}$ such as $N_{b,H}$=1, 2, and 4. Unlike that of vertical dimension, $N_{b,H}$=1 is applicable for horizontal due to a dual-polarization. That is, $N_{b,H}$=1 allows a diversity order of 2.

For a given $2N_{b,H}$ beams generated by the $2N_{b,H}$ column vectors in $P_{1,H}$, eNB 103 performs a beam switching/cycling across frequency (such as either across sub-carriers/REs, RBs, or sub-bands). In this example, the cycling is performed for each of the $v_H$ transmission layers. A cycling pattern is associated with a predetermined sequence or a pattern. When the cycling is performed across sub-carriers or REs, a corresponding open-loop transmission scheme is described as a precoding matrix $C_H(\lambda, i)$, which is a function of transmission layer $\lambda(\lambda \in \{0, 1, \ldots, \max(v)-1\})$ and a RE index i. Therefore, $P_H(\lambda, i)=P_{1,H}C_H(\lambda, i)$ is a composite precoder (analogous to (1)) associated with the layer $\lambda(\lambda \in \{1, 2, \ldots, \max(v_H)\})$ and the RE index i.

In certain embodiments, a cycling pattern and its associated $C_H(\lambda, i)$ matrix is used. The cycling pattern is defined for a given layer $\lambda$. An index parameter $I_{\lambda,i}$ is a precoding vector index for the transmission layer $\lambda$ and a RE index i which is defined starting from 0 and ending at $2N_{b,H}-1$.

$$I_{\lambda,i}=\mod(i+\Delta_\lambda, 2N_{b,H}), i=0,1,\ldots, C_H(\lambda,i)=e_{I_{\lambda,i}}=[0 \ldots 0\ 1\ 0 \ldots 0]^T \quad (7)$$

(a length-$2N_{b,H}$ column vector, only its $(I_{\lambda,i}-1)$-th element is non-zero), where $\Delta_\lambda$ denotes a layer-specific index shift which avoids precoder overlap across different transmission layers. In effect, this pattern performs cycling across $2N_{b,H}$ precoders as is the RE index i is increased.

In certain embodiments, $I_{\lambda,i}$ with the same description of $C_H(\lambda, i)$ is given in the equation below. A cycling is performed in a unit of $v_H$ REs rather than every RE.

$$I_{\lambda,i} = \mod\left(\left\lfloor \frac{i}{v_H} \right\rfloor + \Delta_\lambda, 2N_{b,H}\right), i = 0, 1, \ldots.$$

A precoder cycling is performed across fractions of one RB each of which consists of a plurality of REs or across RBs. An RE index i that is mapped onto resource element (RE) position (k, l) on an antenna port not reserved for other purposes is in increasing order of first the index k corresponding to frequency sub-carrier over the assigned physical resource blocks and then the index/corresponding to an OFDM symbol, starting with the first slot in a subframe.

To support MU-MIMO, a set of cycling patterns $\{I_{\lambda,i}, \lambda=0, 1, \ldots, \max(v)-1\}$ is made UE-specific. In certain embodiments, a UE-specific index shift parameters $\{\Delta_\lambda, \lambda=0, 1, \ldots, \max(v)-1\}$ is assigned. These shift parameters is assigned to the UE 116 implicitly or explicitly. In one example, an implicit assignment is used to link the shift parameters with UE-ID (such as UE RNTI for PDSCH). In another example, an explicit assignment is used to perform explicit signaling from a serving eNB 103 to a UE 116 using either a higher-layer (RRC) signaling or a DL assignment (such as a part of DCI field).

Figure 17A:
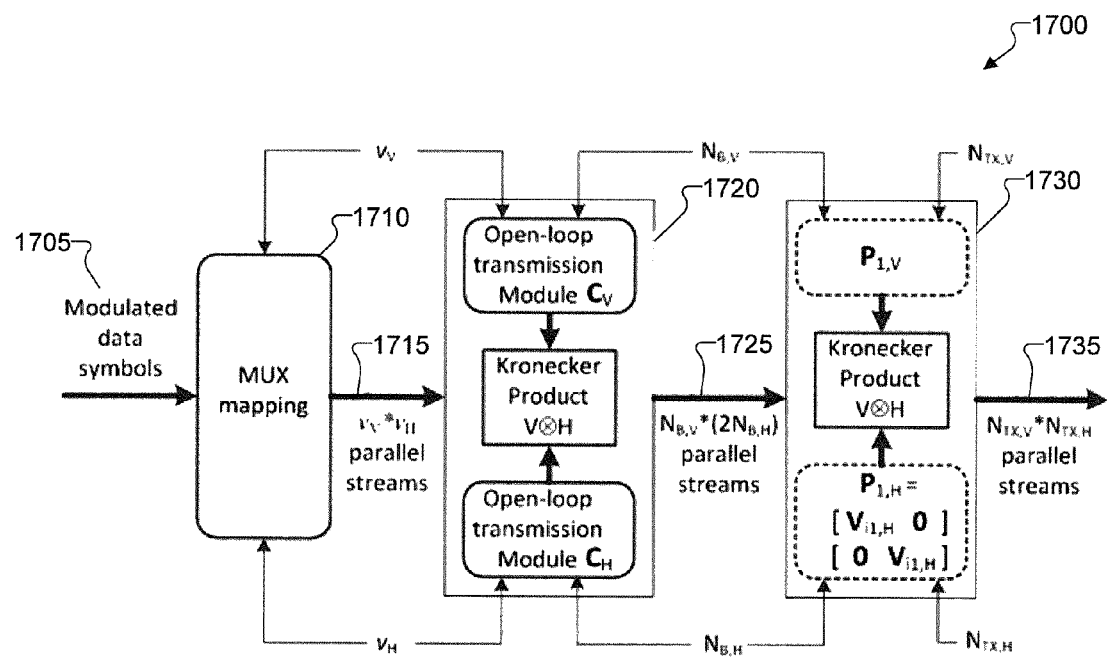
FIG. 17A illustrates an example block diagram of a 2D antenna array according to embodiments of the present disclosure.

FIG. 17A illustrates an example block diagram of a 2D antenna array 1700 utilizing the above horizontal and vertical schemes for the 2D antenna array described in FIG. 11. The embodiment of the 2D antenna array 1700 shown in FIG. 17A is for illustration only. Other embodiments could be used without departing from the scope of the present disclosure.

A stream of modulated data symbols 1705 is multiplexed according to a mapping rule 1710 to generate $v=v_V v_H$ parallel streams 1715. A v represents a total transmission rank or a number of transmission layers for a spatial multiplexing which is a product of a vertical and a horizontal rank. An open-loop transmission module 1720, constructed from a Kronecker product of a vertical and a horizontal module, accepts these v layers as its inputs and outputs $N_B=2N_{b,V}N_{b,H}$ parallel streams 1725 where $N_B>v$ is required to attain transmit diversity gain. These $N_B$ parallel streams are further processed by a dynamic precoding modulate 1730 that is constructed from a Kronecker product of a vertical and a horizontal module as previously described. The output is $N_{TX}=N_{TX,V}N_{TX,H}$ parallel streams 1735, each serving as an input to a TXRU. In this embodiment, in addition to transmission ranks, a number of beams $N_{b,H}$ and $N_{b,V}$ is configured for each UE (such as UE-specific) and adapted at a serving eNB 103.

Figure 17B:
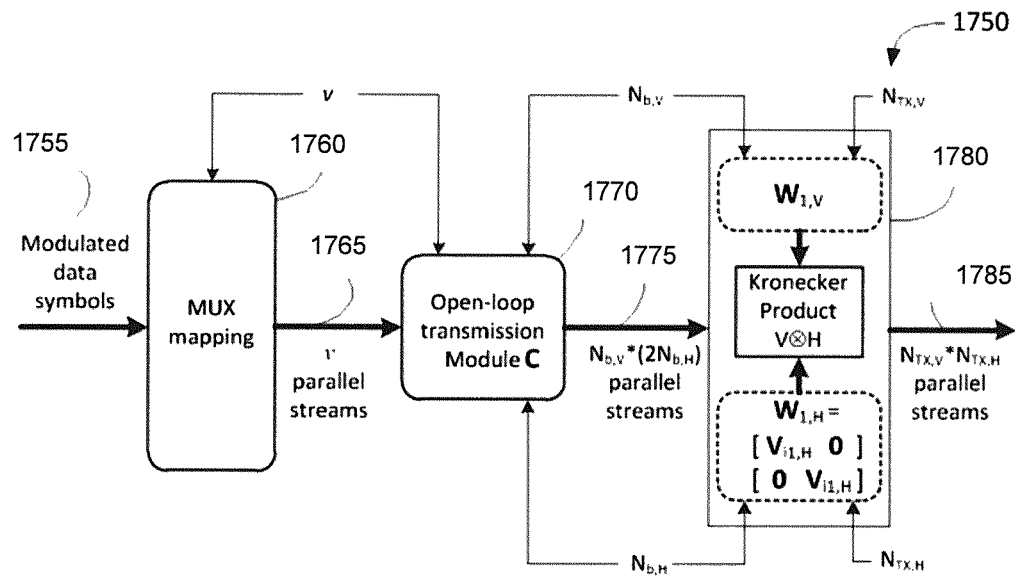
FIG. 17B illustrates another example block diagram of a 2D antenna array according to embodiments of the present disclosure.

FIG. 17B illustrates an example block diagram of a 2D antenna array 1750 utilizing the above horizontal and vertical schemes for the 2D antenna array described in FIG. 11. The embodiment of the 2D antenna array 1750 shown in FIG. 17B is for illustration only. Other embodiments could be used without departing from the scope of the present disclosure. A stream of modulated data symbols 1755 is multiplexed according to a mapping rule 1760 to generate $v=v_V v_H$ parallel streams 1765. A v represents a total transmission rank or a number of transmission layers for a spatial multiplexing which is a product of a vertical and a horizontal rank. An open-loop transmission module 1770, operating on both vertical and horizontal dimensions jointly (see equation (6B)), accepts these v layers as its inputs and outputs $N_B=2N_{b,V}N_{b,H}$ parallel streams 1775 where $N_b>v$ is required to attain transmit diversity gain. Therefore, the open-loop transmission module 1770 operates across $N_B$ parallel streams. These $N_B$ parallel streams are further processed by a dynamic precoding modulate 1780 that is constructed from a Kronecker product of a vertical and a horizontal module as previously described. The output is $N_{TX}=N_{TX,V}N_{TX,H}$ parallel streams 1785, each serving as an input to a TXRU. In this embodiment, in addition to transmission ranks, a number of beams $N_{b,H}$ and $N_{b,V}$ is configured for each UE (such as UE-specific) and adapted at a serving eNB 103.

Figure 18A:
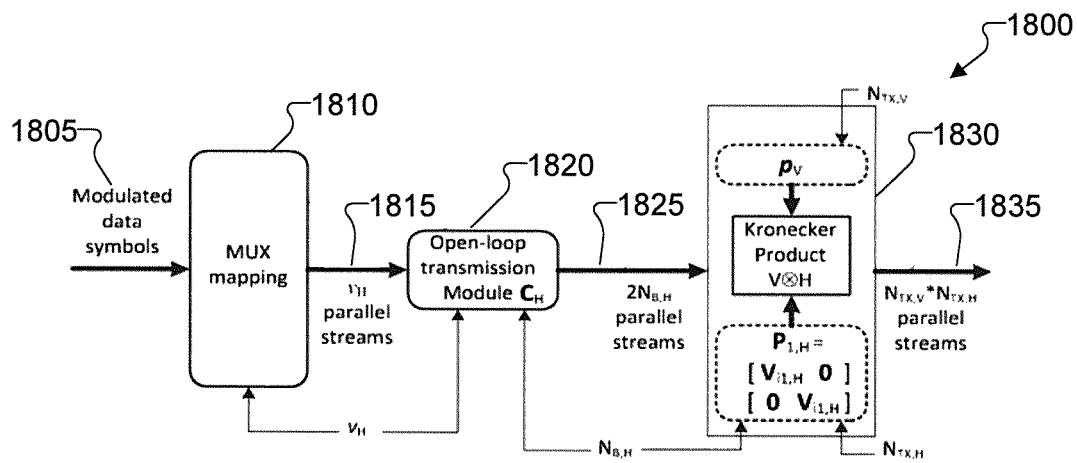
FIG. 18A illustrates another example block diagram of a 2D antenna array according to embodiments of the present disclosure.
Figure 18B:
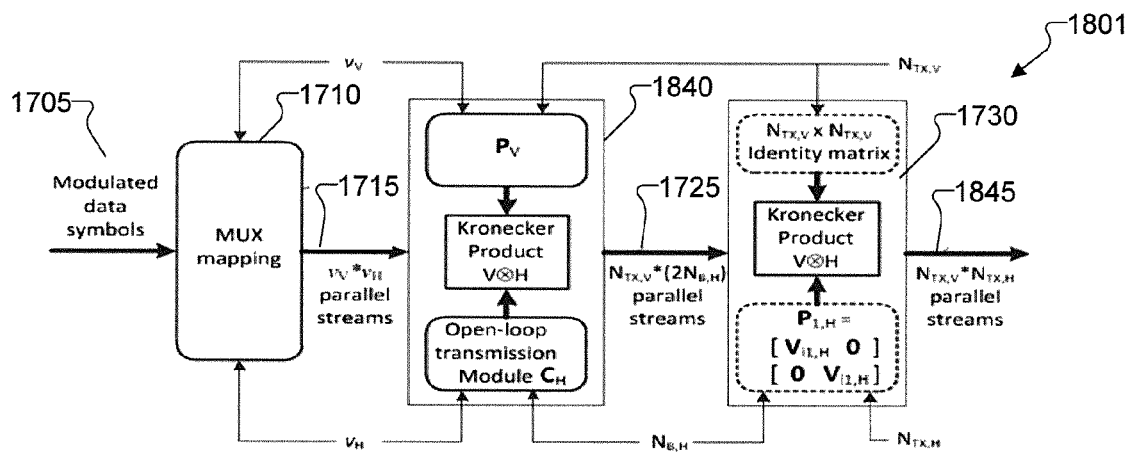
FIG. 18B illustrates another example block diagram of a 2D antenna array according to embodiments of the present disclosure.
Figure 18C:
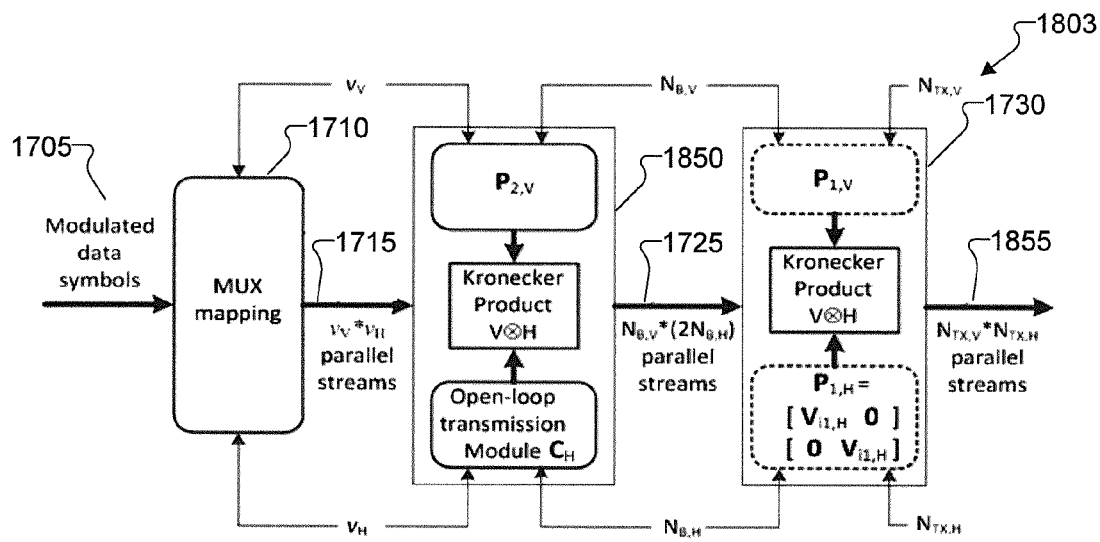
FIG. 18C illustrates another example block diagram of 2D antenna array according to embodiments of the present disclosure.

FIGS. 18A, 18B, and 18C illustrate exemplary block diagrams of a 2D antenna array 1800, 1801 and 1802 where a long-term vertical precoding with $N_{b,V}=1$ is always employed. The antenna arrays shown in FIGS. 18A through 18C are for illustration only. Other embodiments could be used without departing from the scope of the disclosure.

In certain embodiments, a vertical open-loop transmission module is not needed. Consequently, a vertical transmission rank $v_V$ is set to 1. For some UEs, channel variations are configured with a semi-open-loop (OL) transmission in one dimension and a closed-loop (CL) transmission in the other dimension. For example, the channel variations are configured with the semi-OL transmission in a horizontal dimension and/or a CL transmission in a vertical dimension. In certain embodiment, channel variations are applied to the other case in which the semi-OL and CL are in vertical and horizontal dimensions.

In the example shown in FIG. 18A, a stream of modulated data symbols 1805 is multiplexed according to a mapping rule 1810 to generate $v=v_H$ parallel streams 1815. A v represents a total transmission rank or a number of transmission layers for a spatial multiplexing which is a product of a vertical and a horizontal rank. An open-loop transmission module 1820, accepts these v layers as its inputs and outputs $N_B=2N_{b,H}$ parallel streams 1825 where $N_B>v$ is required to attain transmit diversity gain. These $N_B$ parallel streams are further processed by a dynamic precoding modulate 1830 that is constructed from a Kronecker product of a vertical and a horizontal module as previously described. The output is $N_{TX}=N_{TX,V} N_{TX,H}$ parallel streams 1835, each serving as an input to a TXRU. In this embodiment, in addition to transmission ranks, a number of beams $N_{b,H}$ is configured for each UE (such as UE-specific) and adapted at a serving eNB 103.

In certain embodiments, for some UEs, channel variations are configured with a semi-OL transmission in one dimension and a CL transmission in the other dimension. For example, the channel variations are configured with a semi-OL transmission in a horizontal dimension and a CL transmission in a vertical dimension. In certain embodiments, channel variations are applied to the other case in which a semi-OL and a CL are in vertical and horizontal dimensions.

In certain embodiments, as illustrated in FIG. 18B, UE 116 is configured with a single stage short-term/SB vertical pre-coding in a CL transmission. In this embodiment, an open-loop transmission module $C_V$ 1720 illustrated in FIG. 17A is replaced with a short-term/SB vertical pre-coder $P_V$ 1840 and there is no long-term vertical pre-coder.

In certain embodiments, as illustrated in FIG. 18C, UE 116 is configured with a double stage vertical pre-coding in a CL transmission. In this case, an open-loop transmission module $C_V$ 1720 illustrated in FIG. 17A is replaced with a short-term/SB vertical pre-coder $P_{2,V}$ 1850, and there is a long-term vertical precoder $P_{1,V}$.

In certain embodiments, a data transmission entails a precoder cycling across REs or frequency sub-carriers. Therefore, a method processes accompanying UE-specific demodulation RSs with a dynamic precoding module but not with an open-loop transmission module. As illustrated FIG. 17A, the UE-specific demodulation RSs are inserted between the open-loop transmission module 1720 and the dynamic precoding modulate 1730, and multiplexed with the data streams 1703. Likewise, the UE-specific demodulation RSs are inserted between an unit 1820 and an unit 1830, and multiplexed with data streams 1803-A, 1803-B, 1803-C in FIGS. 18A, 18B, and 18C. Therefore, a set of $N_B=2N_{b,V}N_{b,H}$ UE-specific demodulation RS ports are needed for the certain embodiments in FIG. 17A and $N_B=2N_{b,H}$ in FIG. 18.

In certain embodiments, a non-precoded CSI-RS is multiplexed with the data streams 1735 in FIG. 17A, or the data streams 1835 in FIG. 18A, 1845 in FIG. 18B, 1855 in FIG. 18C. In these embodiments, a set of $N_{TX}=N_{TX,V}N_{TX,H}$ CSI-RS ports are assigned for an associated UE 116.

In certain embodiments, a beamformed or a precoded CSI-RS that, just as non-precoded CSI-1RS, is multiplexed with the data streams 1735 in FIG. 17A, or the data streams 1835, 1845, 1855 in FIGS. 18A, 18B, and 18C respectively. In these embodiments, a set of $N_{TX}=N_{TX,V}N_{TX,H}$ CSI-RS ports are assigned for an associated UE 116.

In certain embodiments, a beamformed or a precoded CSI-RS that is multiplexed with a demodulation RS and the data streams 1735 in FIG. 17A, or the demodulation RS and the data streams 1835, 1845, 1855 in FIGS. 18A, 18B, and 18C repectively. In these embodiments, a set of $N_B=2N_{b,V}N_{b,H}$ CSI-RS ports are needed for the embodiment in FIG. 17A and for $N_B=2N_{b,H}$ in FIG. 18A.

To facilitate a CSI reporting from UE 116 to a serving eNB 103, at least one precoding codebook that is associated an index with a recommended precoding matrix is supported. In this disclosure, a set of precoding codebooks pertaining to $P_{1,H}$ and/or $P_{1,V}$ is used. For $P_{1,H}$, each of the codebooks is characterized by a number of parallel input streams per polarization group $N_{b,H}$, which represents a number of beams per polarization group and the number of TXRU (such as antenna) ports in horizontal dimension $N_{TX,H}$. For $P_{1,V}$, each of the codebooks is characterized by a number of parallel input streams $N_{b,V}$, which represents the number of beams and the number of TXRU (such as antenna) ports in vertical dimension $N_{TX,V}$.

For horizontal dimension associated with a 11) dual-polarized array, some exemplary codebook designs for $P_{1,H}$ are given as follows. First, a design for $P_{1,H}$ for a given value of $N_c$ is described as follows (analogous to FIG. 12):

$$V_{i_{1,H}} = \begin{bmatrix} v_{I_0(i_{1,H})} & v_{I_1(i_{1,H})} & \cdots & v_{I_{N_{b,H}-1}(i_{1,H})} \end{bmatrix}, P_{1,H} = \quad (7)$$

$$P_1^{(i_{1,H})} = \begin{bmatrix} V_{i_{1,H}} & 0 \\ 0 & V_{i_{1,H}} \end{bmatrix},$$

where $V_{i_{1,H}}$ is an $N_c \times N_{b,H}$ matrix that includes a set of $N_{b,H}$ beams (such as precoding vectors) for each of the two polarization groups. A set of indices $\{I_0(i_{1,H}), I_1(i_{1,H}), \ldots, I_{N_{b,H}-1}(i_{1,H})\}$ that depends on a precoder vector/matrix index $i_{1,H}$ is utilized to parameterize beams/precoding vectors. To accommodate changes in DL long-term channel statistics such as DL AoD profile, this disclosure includes a design that combines a plurality of codebooks with a structure given in (4)) associated with a plurality of values of $N_{b,H}$.

Co-phasing is also performed on each of the $N_{b,H}$ beams across the two polarization groups. This results in $N_{b,H}$ scalar multiplications in the second block diagonal component of $P_{1,H}$. An example of this embodiment is described as follows:

$$V_{i_{1,H}} = \begin{bmatrix} v_{I_0(i_{1,H})} & v_{I_1(i_{1,H})} & \cdots & v_{I_{N_{b,H}-1}(i_{1,H})} \end{bmatrix}, P_{1,H} = \quad (7A)$$

$$P_1^{(i_{1,H})} = \begin{bmatrix} V_{i_{1,H}} & 0 \\ 0 & V_{i_{1,H}}\Phi \end{bmatrix}$$

$$\Phi = \begin{bmatrix} e^{j\phi_0} & 0 & \cdots & 0 \\ 0 & e^{j\phi_1} & \cdots & 0 \\ \vdots & \vdots & \ddots & \vdots \\ 0 & 0 & \cdots & e^{j\phi_{N_{b,H}-1}} \end{bmatrix}, \phi_n \in$$

$$\left\{0, \frac{2\pi}{N_\phi}, \frac{4\pi}{N_\phi}, \ldots, \frac{2\pi}{N_\phi}(N_\phi - 1)\right\}, n = 0, 1, \ldots, N_{b,H} - 1.$$

A parameter $N_\phi$ determines a resolution of this phase quantization, for example, with $N_\phi=4$, $e^{j\phi_n} \in \{\pm 1, \pm j\}$. This co-phasing operation is incorporated into a codebook design and hence a PMI (such as a separate PMI or a part of the existing PMI). In this example, a total number of PMI hypotheses is increased by a factor of $N_\phi^{N_{b,H}}$ that is equivalent to the need for additional $N_{b,H} \log_2(N_\phi)$ PMI bits. For instance, with $N_\phi=4$, an additional number of PMI bits is $2N_{b,H}$. Similarly, with $N_\phi=1$, the UE 116 is configured with a pre-defined co-phase value for each of $N_{b,H}$ beams. For example, a pre-defined co-phase value is set to 1. In this example, no additional PMI feedback bits are needed.

In certain embodiments, $P_1^{(i_{1,H})}$ addresses a design for $N_c=4$ that corresponds to eight (8) antenna ports and a rank-1 transmission. In Rel.12 LTE 8-port codebook for a precoding feedback, a structure similar to (4) is used but only with one value $N_{b,H}=4$ where $I_\Delta(i_{1,H})=2i_{1,H}+\Delta, \Delta=0, 1, 2, 3$, $i_{1,H}=0, 1, 2, \ldots, 15$, and $v_m=[1 \ e^{j2\pi m/32} \ e^{j4\pi m/32} \ e^{j6\pi m/32}]^T$, where $v_m$ is a length-4 discrete fourier transform (DFT) vector with 8-time over-sampling. For the certain embodiments, this disclosure extends a particular codebook with designs associated with other values of $N_{b,H}$ while maintaining the structure described in (4). An exemplary design is as follows:

$P_{1,H}$ sub-codebook $\Sigma_1$ for $N_{b,H}=1$: description (4) with
$I_\Delta(i_{1,H})=2i_{1,H}$,
$i_{1,H}=0, 1, 2, \ldots, 15$ (size-16 set), $v_m=[1 \ e^{j2\pi m/32} e^{j4\pi m/32} e^{j6\pi m/32}]^T$, $P_{1,H}$ sub-codebook $\Sigma_2$ for $N_{b,H}=2$: description (4) with
$I_\Delta(i_{1,H})=2i_{1,H}+\Delta, \Delta=0, 1$
$i_{1,H}=0, 1, 2, \ldots, 15$ (size-16 set), $v_m=[1e^{j2\pi m/32} e^{j4\pi m/32} e^{j6\pi m/32}]^T$ $P_{1,H}$ sub-codebook $\Sigma_4$ for $N_{b,H}=4$: description (4) with
$I_\Delta(i_{1,H})=2i_{1,H}+\Delta, \Delta=0, 1, 2, 3$
$i_{1,H}=1, 2, \ldots, 15$ (size-16 set), $v_m=[1e^{j2\pi m/32} e^{j4\pi m/32} e^{j6\pi m/32}]^T$ Composite $P_{1,H}$ codebook $\Sigma$: $\Sigma = \Sigma_1 \cup \Sigma_2 \cup \Sigma_4$ In certain embodiments, a rank-1 transmission in iv, $N_c=4$ that corresponds to 8 antenna ports uses a length-4 DFT vector with 4-time over-sampling for $v_m$. This design allows each $P_1^{(i_{1,H})}$ precoder to cover twice AoD spread compared to the previous design at least for $N_{b,H}=2, 4$:

$P_{1,H}$ sub-codebook $\Sigma_1$ for $N_{b,H}=1$: description (4) with
$I_\Delta(i_{1,H})=i_{1,H}$,
$i_{1,H}=0, 1, 2, \ldots, 15$ (size-16 set), $v_m=[1 \ e^{j2\pi m/16} e^{j4\pi m/16} e^{j6\pi m/16}]^T$, $P_{1,H}$ sub-codebook $\Sigma_2$ for $N_{b,H}=2$: description (4) with
$I_\Delta(i_{1,H})=i_{1,H}+\Delta, \Delta=0, 1$
$i_{1,H}=0, 1, 2, \ldots, 15$ (size-16 set), $v_m=[1e^{j2\pi m/16} e^{j4\pi m/16} e^{j6\pi m/16}]^T$ $P_{1,H}$ sub-codebook $\Sigma_4$ for $N_{b,H}=4$: description (4) with
$I_\Delta(i_{1,H})=i_{1,H}+\Delta, \Delta=0, 1, 2, 3$
$i_{1,H}=1, 2, \ldots, 15$ (size-16 set), $v_m=[1e^{j2\pi m/16} e^{j4\pi m/16} e^{j6\pi m/16}]^T$ Composite $P_{1,H}$ codebook $\Sigma$: $\Sigma = \Sigma_1 \cup \Sigma_2 \cup \Sigma_4$ In certain embodiments for $N_c=4$ that corresponds to 8 antenna ports, a rank-1 transmission uses a length-4 DFT vector with a mixture of 4-time and 8-time oversampling for $v_m$. This design allows each $P_1^{(i_{1,H})}$ precoder to use different resolutions for different values of $N_{b,H}$. An example of such a mixed design is as follows:

$P_{1,H}$ sub-codebook $\Sigma_1$ for $N_{b,H}=1$: description (4) with
$I_\Delta(i_{1,H})=i_{1,H}$,
$i_{1,H}=0, 1, 2, \ldots, 15$ (size-16 set), $v_m=[1 \ e^{j2\pi m/16} e^{j4\pi m/16} e^{j6\pi m/16}]^T$, $P_{1,H}$ sub-codebook $\Sigma_2$ for $N_{b,H}=2$: description (4) with
$I_\Delta(i_{1,H})=2i_{1,H}+\Delta, \Delta=0, 1$
$i_{1,H}=0, 1, 2, \ldots, 15$ (size-16 set), $v_m=[1e^{j2\pi m/32} e^{j4\pi m/32} e^{j6\pi m/32}]^T$ $P_{1,H}$ sub-codebook $\Sigma_4$ for $N_{b,H}=4$: description (4) with
$I_\Delta(i_{1,H})=2i_{1,H}+\Delta, \Delta=0, 1, 2, 3$
$i_{1,H}=1, 2, \ldots, 15$ (size-16 set), $v_m=[1e^{j2\pi m/32} e^{j4\pi m/32} e^{j6\pi m/32}]^T$ Composite $P_{1,H}$ codebook $\Sigma$: $\Sigma = \Sigma_1 \cup \Sigma_2 \cup \Sigma_4$ In certain embodiments for $N_c=4$ that corresponds to 8 antenna ports, a rank-1 transmission uses a length-4 DFT vector with a mixture of 4-time and 8-time oversampling for $v_m$. This design allows each $P_1^{(i_{1,H})}$ precoder to use different resolutions for different values of $N_{b,H}$. Furthermore, one value of can be associated with more than one oversampling factor (which results in two different AoD spread coverages). An example of such a mixed design is as follows:

$P_{1,H}$ sub-codebook $\Sigma_1$ for $N_{b,H}=1$: description (4) with
$I_\Delta(i_{1,H})=i_{1,H}$,
$i_{1,H}=0, 1, 2, \ldots, 15$ (size-16 set), $v_m=[1 \ e^{j2\pi m/16} e^{j4\pi m/16} e^{j6\pi m/16}]^T$, $P_{1,H}$ sub-codebook $\Sigma_{4A}$ for $N_{b,H}=2$: description (4) with
$I_\Delta(i_{1,H})=2i_{1,H}+\Delta, \Delta=0, 1, 2, 3$
$i_{1,H}=0, 1, 2, \ldots, 15$ (size-16 set), $v_m=[1e^{j2\pi m/32} e^{j4\pi m/32} e^{j6\pi m/32}]^T$ $P_{1,H}$ sub-codebook $\Sigma_{4B}$ for $N_{b,H}=4$: description (4) with
$I_\Delta(i_{1,H})=i_{1,H}+\Delta, \Delta=0, 1, 2, 3$
$i_{1,H}=1, 2, \ldots, 15$ (size-16 set), $v_m=[1e^{j2\pi m/16} e^{j4\pi m/16} e^{j6\pi m/16}]^T$ Composite $P_{1,H}$ codebook $\Sigma$: $\Sigma = \Sigma_1 \cup \Sigma_{4A} \cup \Sigma_{4B}$ Another exemplary design for $N_c=4$, which corresponds to 8 antenna ports, and rank-1 transmission uses a length-4 DFT vector with 8-time oversampling for $v_m$. This design assumes each $P_1^{(i_{1,H})}$ precoder to have $N_{b,H}$ beams that are uniformly spaced. In this design, different values are considered for the spacing between beams. This design enables coverage for both wide or narrow channel AoD spread and multiple channel clusters. An example of such a codebook is as follows:

$P_{1,H}$ sub-codebook $\Sigma_1$ for $N_{b,H}=4$: description (4) with
$I_\Delta(i_{1,H})=2i_{1,H}+\Delta, \Delta=0, 1, 2, 3$
(offset=2, spacing=1)
$i_{1,H}=0, 1, 2, \ldots, 15$ (size-16 set), $v_m=[1 \ e^{j2\pi m/32} e^{j4\pi m/32} e^{j6\pi m/32}]^T$ $P_{1,H}$ sub-codebook $\Sigma_2$ for $N_{b,H}=4$: description (4) with
$I_\Delta(i_{1,H})=4i_{1,H}+\Delta, \Delta=0, 2, 4, 6$
(offset=4, spacing=2)
$i_{1,H}=0, 1, 2, \ldots, 7$ (size-8 set), $v_m=[1 \ e^{j2\pi m/32} e^{j4\pi m/32} e^{j6\pi m/32}]^T$ $P_{1,H}$ sub-codebook $\Sigma_3$ for $N_{b,H}=4$: description (4) with
$I_\Delta(i_{1,H})=8i_{1,H}+\Delta, \Delta=0, 4, 8, 12$
(offset=8, spacing=4)
$i_{1,H}=0, 1, 2, \ldots, 3$ (size-4 set), $v_m=[1 \ e^{j2\pi m/32} e^{j4\pi m/32} e^{j6\pi m/32}]^T$ $P_{1,H}$ sub-codebook $\Sigma_4$ for $N_{b,H}=4$: description (4) with
$I_\Delta(i_{1,H})=16i_{1,H}+\Delta, \Delta=0, 8, 16, 24$
(offset=16, spacing=8)

$i_{1,H}=0$, (size-1 set), $v_m=[1\ e^{j2\pi m/32}e^{j4\pi m/32}\ e^{j6\pi m/32}]^T$ Composite $P_{2,H}$ codebook $\Sigma$: $\Sigma=\Sigma_1\cup\Sigma_2\cup\Sigma_3\cup\Sigma_4$ Note that in this design, for a given inter-beam spacing, an overlap of two beams exists between two consecutive candidate sets of beams. In certain embodiments, a codebook is as follows:

$P_{1,H}$ sub-codebook $\Sigma_1$ for $N_{b,H}=4$: description (4) with
  $I_\Delta(i_{1,H})=4i_{1,H}+\Delta, \Delta=0, 1, 2, 3$
  (offset=4, spacing=1)
$i_{1,H}=0, 1, 2, \ldots, 7$ (size-8 set), $v_m=[1\ e^{j2\pi m/32}e^{j4\pi m/32}\ e^{j6\pi m/32}]^T$ $P_{1,H}$ sub-codebook $\Sigma_2$ for $N_{b,H}=4$: description (4) with
  $I_\Delta(i_{1,H})=8i_{1,H}+\Delta, \Delta=0, 2, 4, 6$
  (offset=8, spacing=2)
$i_{1,H}=0, 1, 2, \ldots, 3$ (size-4 set), $v_m=[1\ e^{j2\pi m/32}e^{j4\pi m/32}\ e^{j6\pi m/32}]^T$ $P_{1,H}$ sub-codebook $\Sigma_3$ for $N_{b,H}=4$: description (4) with
  $I_\Delta(i_{1,H})=16i_{1,H}+\Delta, \Delta=0, 4, 8, 12$
  (offset=16, spacing=4)
$i_{1,H}=0, 1$ (size-2 set), $v_m=[1\ e^{j2\pi m/32}e^{j4\pi m/32}\ e^{j6\pi m/32}]^T$ $P_{1,H}$ sub-codebook $\Sigma_4$ for $N_{b,H}=4$: description (4) with
  $I_\Delta(i_{1,H})=\Delta, \Delta=0, 8, 16, 24$
  (offset=32, spacing=8)
$i_{1,H}=0$, (size-1 set), $v_m=[1\ e^{j2\pi m/32}e^{j4\pi m/32}\ e^{j6\pi m/32}]^T$ Composite $P_{1,H}$ codebook $\Sigma$: $\Sigma=\Sigma_1\cup\Sigma_2\cup\Sigma_3\cup\Sigma_4$ Note that in this design for a given inter-beam spacing, no overlap of beams occurs between two consecutive candidate sets of beams. Note also that this codebook is a subset of the previous codebook (overlap of two beams). So, a 1-bit indication can be used to indicate the beam selection with or without overlap.

In certain embodiments, $\Sigma_4$ codebook is an orthogonal codebook. An example of orthogonal $\Sigma_4$ codebook is as follows:

$P_{1,H}$ sub-codebook $\Sigma_4$ for $N_{b,H}=4$: description (4) with
  $I_\Delta(i_{1,H})=2i_{1,H}+\Delta, \Delta=0, 8, 16, 24$
  (offset=2, spacing=8)
$i_{1,H}=0, 1, 2, 3$ (size-4 set), $v_m=[1\ e^{j2\pi m/32}e^{j4\pi m/32}\ e^{j6\pi m/32}]^T$ In certain embodiment, the above four exemplary designs for $N_c=4$ are modified in various manners without departing from the scope of this disclosure. For example, a different set of $N_{b,H}$ values is used such as $\{1, 2, 3, 4\}$ or $\{1, 2, 4, 6\}$ or $\{1, 2, 4, 8\}$ or $\{2, 4\}$ or $\{1, 4\}$. In another example, at least one different DFT over-sampling factor is used for at least one of the sub-codebooks. In yet another instance, a set size different from 16 is used.

For each of the above exemplary embodiments, a common underlying DFT precoding structure is used for all the sub-codebooks. Therefore, each sub-codebook is described as a select subset of either a larger or master codebook, where a subset selection is associated with an indicator. This indicator is signaled either as a UE feedback or an eNB configuration. This holds even for a codebook composed of a mixture of several over-sampling factors. For example, from the third exemplary embodiment, $I_\Delta(i_{1,H})+i_{1,H}+\Delta, \Delta=0, 1, 2, 3$, $v_m=[1\ e^{j2\pi m/16}e^{j4\pi m/16}\ e^{j6\pi m/16}]^T$ is equivalent to $I_\Delta(i_{1,H})=2(i_{1,H}+\Delta), \Delta=0, 1, 2, 3$, $v_m=[1\ e^{j2\pi m/32}e^{j4\pi m/32}\ e^{j6\pi m/32}]^T$.

In certain embodiments, $P_1^{(i_{1,H})}$ addresses a design for $N_c=2$, which corresponds to 4 antenna ports and rank-1 transmission.

In Rel.12 LTE 4-port codebook for precoding feedback, a structure similar to equation (7) is used but only with one value $N_{b,H}=4$ where $I_\Delta(i_{1,H})=i_{1,H}+8\Delta, \Delta=0, 1, 2, 3$, $i_{1,H}=0, 1, 2, \ldots, 15$, and $v_m=[1\ e^{j2\pi m/32}]^T$. Here $v_m$ is a length-2 discrete Fourier Transform (DFT) vector with 16-time over-sampling and each $V_{i_{1,H}}$ covers a full circle ($2\pi$ phase coverage) with a possibly different phase offset. For the certain embodiments, this disclosure replaces the particular codebook with designs associated with other values of $N_{b,H}$ while maintaining the structure described in equation (7). An exemplary design is as follows:

$P_{1,H}$ sub-codebook $\Sigma_1$ for $N_{b,H}=1$: description (4) with
  $I_\Delta(i_{1,H})=2i_{1,H}$
$i_{1,H}=0, 1, 2, \ldots, 15$ (size-16 set), $v_m=[1\ e^{j2\pi m/32}]^T$
$P_{1,H}$ sub-codebook $\Sigma_2$ for $N_{b,H}=2$: description (4) with
  $I_\Delta(i_{1,H})=2i_{1,H}+\Delta, \Delta=0, 1$
$i_{1,H}=0, 1, 2, \ldots, 15$ (size-16 set), $v_m=[1\ e^{j2\pi m/32}]^T$
$P_{1,H}$ sub-codebook $\Sigma_4$ for $N_{b,H}=4$: description (4) with
  $I_\Delta(i_{1,H})=2i_{1,H}+\Delta, \Delta=0, 1, 2, 3$
$i_{1,H}=0, 1, 2, \ldots, 15$ (size-16 set), $v_m=[1\ e^{j2\pi m/32}]^T$ Composite $P_{1,H}$ codebook $\Sigma$: $\Sigma=\Sigma_1\cup\Sigma_2\cup\Sigma_4$ In certain embodiments for $N_c=2$, which corresponds to 4 antenna ports, a rank-1 transmission uses a length-2 DFT vector with 8-time oversampling for $v_m$. This design allows each $P_1^{(i_{1,H})}$ precoder to cover twice AoD spread compared to the previous design at least for $N_{b,H}=2, 4$:

$P_{1,H}$ sub-codebook $\Sigma_1$ for $N_{b,H}=1$: description (4) with
  $I_\Delta(i_{1,H})=i_{1,H}$
$i_{1,H}=0, 1, 2, \ldots, 15$ (size-16 set), $v_m=[1\ e^{j2\pi m/16}]^T$
$P_{1,H}$ sub-codebook $\Sigma_2$ for $N_{b,H}=2$: description (4) with
  $I_\Delta(i_{1,H})=i_{1,H}+\Delta, \Delta=0, 1$
$i_{1,H}=0, 1, 2, \ldots, 15$ (size-16 set), $v_m=[1\ e^{j2\pi m/16}]^T$
$P_{1,H}$ sub-codebook $\Sigma_4$ for $N_{b,H}=4$: description (4) with
  $I_\Delta(i_{1,H})=i_{1,H}+\Delta, \Delta=0, 1, 2, 3$
$i_{1,H}=0, 1, 2, \ldots, 15$ (size-16 set), $v_m=[1\ e^{j2\pi m/16}]^T$ Composite $P_{1,H}$ codebook $\Sigma$: $\Sigma=\Sigma_1\cup\Sigma_2\cup\Sigma_4$ In certain embodiments for $N_c=2$, which corresponds to 4 antenna ports, a rank-1 transmission uses a length-2 DFT vector with a mixture of 6-time and 16-time oversampling for $v_m$. This design allows each $P_1^{(i_{1,H})}$ precoder to use different resolutions for different values of $N_{b,H}$. An example of such a mixed design is as follows:

$P_{1,H}$ sub-codebook $\Sigma_1$ for $N_{b,H}=1$: description (4) with
  $I_\Delta(i_{1,H})=i_{1,H}$
$i_{1,H}=0, 1, 2, \ldots, 15$ (size-16 set), $v_m=[1\ e^{j2\pi m/16}]^T$
$P_{1,H}$ sub-codebook $\Sigma_2$ for $N_{b,H}=2$: description (4) with
  $I_\Delta(i_{1,H})=2i_{1,H}+\Delta, \Delta=0, 1$
$i_{1,H}=0, 1, 2, \ldots, 15$ (size-16 set), $v_m=[1\ e^{j2\pi m/32}]^T$
$P_{1,H}$ sub-codebook $\Sigma_4$ for $N_{b,H}=4$: description (4) with
  $I_\Delta(i_{1,H})=2i_{1,H}+\Delta, \Delta=0, 1, 2, 3$
$i_{1,H}=0, 1, 2, \ldots, 15$ (size-16 set), $v_m=[1\ e^{j2\pi m/32}]^T$ Composite $P_{1,H}$ codebook $\Sigma$: $\Sigma=\Sigma_1\cup\Sigma_2\cup\Sigma_4$ In certain embodiments for $N_c=2$ (such as 4 antenna ports), a rank-1 transmission uses a length-2 DFT vector with a mixture of 8-time and 16-time oversampling for $V_m$. This design allows each $P_1^{(i_{1,H})}$ precoder to use different resolutions for different values of $N_{b,H}$. Furthermore, more than one value is associated with more than one oversampling factor which results in two different AoD spread coverages. An example of such a mixed design is as follows:

$P_{1,H}$ sub-codebook $\Sigma_1$ for $N_{b,H}=1$: description (4) with
  $I_\Delta(i_{1,H})=i_{1,H}$
$i_{1,H}=0, 1, 2, \ldots, 15$ (size-16 set), $v_m=[1\ e^{j2\pi m/16}]^T$
$P_{1,H}$ sub-codebook $\Sigma_{4A}$ for $N_{b,H}=2$: description (4) with
  $I_\Delta(i_{1,H})=i_{1,H}+\Delta, \Delta=0, 1, 2, 3$
$i_{1,H}=0, 1, 2, \ldots, 15$ (size-16 set), $v_m=[1\ e^{j2\pi m/32}]^T$
$P_{1,H}$ sub-codebook $\Sigma_{4B}$ for $N_{b,H}=4$: description (4) with
  $I_\Delta(i_{1,H})=i_{1,H}+\Delta, \Delta=0, 1, 2, 3$
$i_{1,H}=0, 1, 2, \ldots, 15$ (size-16 set), $v_m=[1\ e^{j2\pi m/16}]^T$ Composite $P_{1,H}$ codebook $\Sigma$: $\Sigma=\Sigma_1\cup\Sigma_{4A}\cup\Sigma_{4B}$ The above four exemplary designs for $N_c=2$ are modified in various manners without departing from the spirit of this disclosure. For example, a different set of $N_{b,H}$ values is used as $\{1, 2, 3, 4\}$ or $\{1, 2, 4, 6\}$ or $\{1, 2, 4, 8\}$ or $\{2, 4\}$ or $\{1, 4\}$. In another example, at least one different DFT oversampling factor is used for at least one of the sub-codebooks. In another example, a set size different from 16 is used.

For each of the above exemplary embodiments, a common underlying DFT precoding structure is used for all the sub-codebooks. Therefore, each sub-codebook is described as a select subset of either a larger or a master codebook, where the subset selection is associated with an indicator. The indicator is signaled either as a UE feedback or an eNB configuration. This holds even for a codebook composed of a mixture of several oversampling factors. For example, from the third exemplary embodiment, $I_\Delta(i_{1,H})=i_{1,H}+\Delta, \Delta=0, 1, 2, 3$, $v_m=[1\ e^{j2\pi m/16}]^T$ is equivalent to $I_\Delta(i_{1,H})=2(i_{1,H}+\Delta)$, $\Delta=0, 1, 2, 3$, $v_m=[1\ e^{j2\pi m/32}]^T$. For vertical dimension associated with a 1D single-polarized array, some exemplary $P_{1,V}$ codebook designs are given as follows. First, a design for $P_{1,V}$ for a given value of $N_r$ is described as follows:

$$P_{1,V} = P_1^{(i_{1,V})} = \begin{bmatrix} v_{I_0(i_{1,V})} & v_{I_1(i_{1,V})} & \cdots & v_{I_{N_{b,V}-1}(i_{1,V})} \end{bmatrix}, \quad (9)$$

$$v_m = \begin{bmatrix} 1 & e^{j\frac{2\pi m}{O_r N_r}} & e^{j\frac{4\pi m}{O_r N_r}} & \cdots & e^{j\frac{2\pi(N_r-1)m}{O_r N_r}} \end{bmatrix}^T$$

Here $P_{i_{1,V}}$ is an $N_r \times N_{b,V}$ matrix that includes a set of $N_{b,V}$ beams (such as precoding vectors). A set of indices $\{I_0(i_{1,V}), I_1(i_{1,V}), \ldots, I_{N_{b,V}-1}(i_{1,V})\}$ that depends on a precoder vector/matrix index $i_{1,V}$ is utilized to parameterize the beams/precoding vectors. An integer parameter $O_r$ denotes an amount of over-sampling on a phase domain. This disclosure includes a design that combines a plurality of codebooks with a structure given in equation (7) associated with a plurality of values of $N_{b,V}$.

In certain embodiments, $P_1^{(i_{1,V})}$ addresses a design for $N_r=8$, which corresponds to 8 antenna ports and a rank-1 transmission with 4-time oversampling.

$P_{1,V}$ sub-codebook $\Sigma_1$ for $N_{b,V}=1$: description (6) with
$I_\Delta(i_{1,V})=2i_{1,V}$
$i_{1,V}=0, 1, 2, \ldots, 15$ (size-16 set), $$v_m = \begin{bmatrix} 1 & e^{j\frac{2\pi m}{32}} & e^{j\frac{4\pi m}{32}} & \cdots & e^{j\frac{14\pi m}{32}} \end{bmatrix}^T$$

$P_{1,V}$ sub-codebook $\Sigma_2$ for $N_{b,V}=2$: description (6) with
$I_\Delta(i_{1,V})=2i_{1,V}+\Delta, \Delta=0, 1$
$i_{1,V}=0, 1, 2, \ldots, 15$ (size-16 set), $$v_m = \begin{bmatrix} 1 & e^{j\frac{2\pi m}{32}} & e^{j\frac{4\pi m}{32}} & \cdots & e^{j\frac{14\pi m}{32}} \end{bmatrix}^T$$

$P_{1,V}$ sub-codebook $\Sigma_4$ for $N_{b,V}=4$: description (6) with
$I_\Delta(i_{1,H})=2i_{1,V}+\Delta, \Delta=0, 1, 2, 3$
$i_{1,V}=0, 1, 2, \ldots, 15$ (size-16 set), $$v_m = \begin{bmatrix} 1 & e^{j\frac{2\pi m}{32}} & e^{j\frac{4\pi m}{32}} & \cdots & e^{j\frac{14\pi m}{32}} \end{bmatrix}^T$$

Composite $P_{1,V}$ codebook $\Sigma$: $\Sigma = \Sigma_1 \cup \Sigma_2 \cup \Sigma_4$ In certain embodiments, $P_1^{(i_{1,V})}$ addresses a design for $N_r=8$, which corresponds to 8 antenna ports and a rank-1 transmission with 2-time over-sampling.

$P_{1,V}$ sub-codebook $\Sigma_1$ for $N_{b,V}=1$: description (6) with
$I_\Delta(i_{1,V})=2i_{1,V}$
$i_{1,V}=0, 1, 2, \ldots, 7$ (size-8 set), $$v_m = \begin{bmatrix} 1 & e^{j\frac{2\pi m}{16}} & e^{j\frac{4\pi m}{16}} & \cdots & e^{j\frac{14\pi m}{16}} \end{bmatrix}^T$$

$P_{1,V}$ sub-codebook $\Sigma_2$ for $N_{b,V}=2$: description (6) with
$I_\Delta(i_{1,V})=2i_{1,V}+\Delta, \Delta=0, 1$
$i_{1,V}=0, 1, 2, \ldots, 7$ (size-8 set), $$v_m = \begin{bmatrix} 1 & e^{j\frac{2\pi m}{16}} & e^{j\frac{4\pi m}{16}} & \cdots & e^{j\frac{14\pi m}{16}} \end{bmatrix}^T$$

$P_{1,V}$ sub-codebook $\Sigma_4$ for $N_{b,V}=4$: description (6) with
$I_\Delta(i_{1,V})=2i_{1,V}+\Delta, \Delta=0, 1, 2, 3$
$i_{1,V}=0, 1, 2, \ldots, 7$ (size-8 set), $$v_m = \begin{bmatrix} 1 & e^{j\frac{2\pi m}{16}} & e^{j\frac{4\pi m}{16}} & \cdots & e^{j\frac{14\pi m}{16}} \end{bmatrix}^T$$

Composite $P_{1,V}$ codebook $\Sigma$: $\Sigma = \Sigma_1 \cup \Sigma_2 \cup \Sigma_4$ In certain embodiments, $P_1^{(i_{1,V})}$ addresses a design for $N_r=8$, which corresponds to 8 antenna ports and rank-1 transmission with a mixture between a 2-time and a 4-time oversampling.

$P_{1,V}$ sub-codebook $\Sigma_1$ for $N_{b,V}=1$: description (6) with
$I_\Delta(i_{1,V})=2i_{1,V}$
$i_{1,V}=0, 1, 2, \ldots, 7$ (size-8 set), $$v_m = \begin{bmatrix} 1 & e^{j\frac{2\pi m}{16}} & e^{j\frac{4\pi m}{16}} & \cdots & e^{j\frac{14\pi m}{16}} \end{bmatrix}^T$$

$P_{1,V}$ sub-codebook $\Sigma_2$ for $N_{b,V}=2$: description (6) with
$I_\Delta(i_{1,V})=4i_{1,V}+\Delta, \Delta=0, 1$
$i_{1,V}=0, 1, 2, \ldots, 7$ (size-8 set), $$v_m = \begin{bmatrix} 1 & e^{j\frac{2\pi m}{32}} & e^{j\frac{4\pi m}{32}} & \cdots & e^{j\frac{14\pi m}{32}} \end{bmatrix}^T$$

$P_{1,V}$ sub-codebook $\Sigma_4$ for $N_{b,V}=4$: description (6) with
$I_\Delta(i_{1,V})=2i_{1,V}+\Delta, \Delta=0, 1, 2, 3$
$i_{1,V}=0, 1, 2, \ldots, 7$ (size-8 set), $$v_m = \begin{bmatrix} 1 & e^{j\frac{2\pi m}{32}} & e^{j\frac{4\pi m}{32}} & \cdots & e^{j\frac{14\pi m}{32}} \end{bmatrix}^T$$

Composite $P_{1,V}$ codebook $\Sigma$: $\Sigma = \Sigma_1 \cup \Sigma_2 \cup \Sigma_4$ In certain embodiments, $P_1^{(i_{1,V})}$ addresses a design for $N_r=4$ (such as corresponds to 4 antenna ports) and a rank-1 transmission with a 4-time oversampling.

$P_{1,V}$ sub-codebook $\Sigma_1$ for $N_{b,V}=1$: description (6) with
$I_\Delta(i_{1,V})=2i_{1,V}$
$i_{1,V}=0, 1, 2, \ldots, 7$ (size-8 set), $$v_m = \begin{bmatrix} 1 & e^{j\frac{2\pi m}{16}} & e^{j\frac{4\pi m}{16}} & e^{j\frac{6\pi m}{16}} \end{bmatrix}^T$$

$P_{1,V}$ sub-codebook $\Sigma_2$ for $N_{b,V}=2$: description (6) with
$I_\Delta(i_{1,V})=2i_{1,V}+\Delta, \Delta=0, 1$
$i_{1,V}=0, 1, 2, \ldots, 7$ (size-8 set), $$v_m = \begin{bmatrix} 1 & e^{j\frac{2\pi m}{16}} & e^{j\frac{4\pi m}{16}} & e^{j\frac{6\pi m}{16}} \end{bmatrix}^T$$

$P_{1,V}$ sub-codebook $\Sigma_4$ for $N_{b,V}=4$: description (6) with
$I_\Delta(i_{1,V})=2i_{1,V}+\Delta, \Delta=0, 1, 2, 3$
$i_{1,V}=0, 1, 2, \ldots, 7$ (size-8 set), $$v_m = \begin{bmatrix} 1 & e^{j\frac{2\pi m}{16}} & e^{j\frac{4\pi m}{16}} & e^{j\frac{6\pi m}{16}} \end{bmatrix}^T$$

Composite $P_{1,V}$ codebook $\Sigma$: $\Sigma = \Sigma_1 \cup \Sigma_2 \cup \Sigma_4$ In certain embodiments, $P_1^{(i_1,V)}$ addresses a design for $N_t=4$ (such as corresponds to 4 antenna ports) and a rank-1 transmission with a 2-time over-sampling.

$P_{1,V}$ sub-codebook $\Sigma_1$ for $N_{b,V}=1$: description (6) with
$I_\Delta(i_{1,V})=2i_{1,V}$
$i_{1,V}=0, 1, 2, 3$ (size-4 set), $$v_m = \begin{bmatrix} 1 & e^{j\frac{2\pi m}{8}} & e^{j\frac{4\pi m}{8}} & e^{j\frac{6\pi m}{8}} \end{bmatrix}^T$$

$P_{1,V}$ sub-codebook $\Sigma_2$ for $N_{b,V}=2$: description (6) with
$I_\Delta(i_{1,V})=2i_{1,V}+\Delta, \Delta=0, 1$
$i_{1,V}=0, 1, 2, 3$ (size-4 set), $$v_m = \begin{bmatrix} 1 & e^{j\frac{2\pi m}{8}} & e^{j\frac{4\pi m}{8}} & e^{j\frac{6\pi m}{8}} \end{bmatrix}^T$$

$P_{1,V}$ sub-codebook $\Sigma_4$ for $N_{b,V}=4$: description (6) with
$I_\Delta(i_{1,V})=2i_{1,V}+\Delta, \Delta=0, 1, 2, 3$
$i_{1,V}=0, 1, 2, 3$ (size-4 set), $$v_m = \begin{bmatrix} 1 & e^{j\frac{2\pi m}{8}} & e^{j\frac{4\pi m}{8}} & e^{j\frac{6\pi m}{8}} \end{bmatrix}^T$$

Composite $P_{1,V}$ codebook $\Sigma$: $\Sigma = \Sigma_1 \cup \Sigma_2 \cup \Sigma_4$ The above exemplary designs are modified in various manners without departing from the scope of this disclosure. For example, a different set of $N_{b,V}$ values is used, such as {1, 2, 3, 4} or {1, 2, 4, 6} or {1, 2, 4, 8} or {2, 4} or {1, 4} or {1} or {2}. In another example, at least one different DFT oversampling factor is used for at least one of the sub-codebooks. In yet another instance, a set size different from 8 or 16 is used.

In certain embodiments, a vertical precoding codebook is designed based on a single-stage structure. The certain embodiments are suitable when vertical channel characteristics vary slowly so that a short-term precoding adaptation offers marginal performance gains. In this case, only one indicator $i_V$ (such as opposed to two indicator $i_{1,V}$ and $i_{2,V}$) is necessary. This compact design is described in TABLE 5.

TABLE 5

| $i_V$ | Precoder |
|---|---|
| 0-15 | $W_{2i_V}^{(1)}$ | where $W_m^{(1)} = \frac{1}{\sqrt{8}} \begin{bmatrix} 1 & e^{j2\pi m/32} & e^{j4\pi m/32} & \ldots & e^{j14\pi m/32} \end{bmatrix}^T$ or

| $i_V$ | Precoder |
|---|---|
| 0-15 | $W_{i_V}^{(1)}$ | where $W_m^{(1)} = \frac{1}{\sqrt{8}} \begin{bmatrix} 1 & e^{j2\pi m/16} & e^{j4\pi m/16} & \ldots & e^{j14\pi m/16} \end{bmatrix}^T$ To calculate a CSI at a UE 116, the UE 116 first receives configuration information from a serving eNB 103 pertaining to a choice of $P_{1,H}$ and $P_{1,V}$ sub-codebooks for the UE 116. This information is signaled to the UE 116 via a downlink channel, either via higher-layer (RRC) signaling or a DL assignment as a DCI (downlink control information) field on PDCCH/ePDCCH. This sub-codebook selection entails a setting of the value of $N_{b,H}$ for a horizontal sub-codebook and $N_{b,V}$ for a vertical sub-codebook. It also entails codebook subset indicators (such as CB-HIndicator and CB-VIndicator) for the horizontal and the vertical sub-codebook, respectively. Having received such a setting from the serving eNB 103, the UE 116 assumes the horizontal and the vertical sub-codebook associated with the configured sub-codebook selection. This setting in turn determines a choice of an open-loop transmission method for a horizontal dimension and a vertical dimension (such as given that the UE 116 is configured for this reduced feedback transmission mode). The configuration information for the open-loop transmission and dynamic precoding allows the UE 116 to calculate the CSI accordingly as the UE measures its configured CSI-RS resource or resources.

Compared to $P_{2,H}$ or $P_{2,V}$ in the fully closed-loop method, PMIs associated with a long-term precoders $P_{1,H}$ or $P_{1,V}$ (such as $i_{1,H}$ or $i_{1,V}$) are reported at most at the same rate as PMIs associated with a short-term $P_{2,H}$ or $P_{2,V}$. Thus, $i_{1,H}$ or $i_{1,V}$ are expected to be reported as a low rate (such as high periodicity), for example, a long-term feedback.

The above description assumes that $P_{1,H}$ and $P_{1,V}$ sub-codebooks are utilized for both the horizontal and the vertical dimension. Alternatively, the eNB 103 utilizes a single-stage $p_V$ precoding vector for the vertical dimension. In this embodiment, configuration information pertaining $P_{1,V}$ sub-codebook is not applicable. Neither is open-loop transmission for the vertical dimension.

FIGS. 19A and 19B illustrate example procedures 1900 and 1901 of a CSI calculation utilizing a sub-codebook and a single vertical precoder, respectively. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a UE.

For the eNB 103, this first precoding stage is used to select a plurality of beams across which the eNB 103 applies a diversity scheme such as a beam switching, a layer permutation, or a space-frequency coding. In certain embodiments, a sub-codebook $P_{1,V}$ is utilized. In certain embodiments, a single vertical precoder $p_V$ is utilized. In the certain embodiments, a UE 116 receives and decodes a signaling 1905 from an eNB 103. This signaling 1905 includes a selection indicator of a horizontal $P_{1,H}$ sub-codebook 1910, which is taken from the master $P_{1,H}$ codebook 1915. Similarly, the aforementioned signaling 1905 includes a selection indicator of a vertical $P_{1,V}$ sub-codebook 1920 which is taken from a master $P_{1,V}$ codebook 1925. These two selections for horizontal $P_{1,H}$ sub-codebook 1910 and vertical $P_{1,V}$ sub-codebook 1920 are assumed by the UE 116 in CSI (such as CQI, PMI, and RI) calculation 1930.

In certain embodiments, UE 116 receives and decodes a signaling 1945 from an eNB 103. The signaling 1945 can be the same as, or different from, signaling 1905. This signaling 1945 includes a selection indicator of a horizontal $P_{1,H}$ sub-codebook 1950, which is taken from a master $P_{1,H}$ codebook 1955. While the horizontal codebook in the first procedure 1900 possesses a dual-stage structure, this procedure 1901 assumes a vertical codebook 1960 with a single-stage structure. The selection for horizontal codebooks 1950 and 1955, along with the vertical codebook 1960, is assumed by the UE 116 in CSI (such as CQI, PMI, and RI) calculation 1965.

In certain embodiments, the above descriptions are applicable for cases when a served UE 116 is configured to measure at least one non-precoded CSI-RS. In certain embodiments, a served UE 116 is configured to measure at least one precoded or beamformed CSI-RS. When the served UE 116 measures at least one precoded or beamformed CSI-RS, an alternative embodiment is devised if the serving eNB 103 applies $P_{1,H}$ or $P_{1,V}$ (or, alternatively, $p_V$) to the CSI-RS resources assigned to the served UE 116. In this embodiment, the UE 116 does not need to know any long-term precoding information other than the number of precoded/beamformed CSI-RS ports, including the horizontal and the vertical dimensions. For example, the UE 116 receives $N_{b,V}$ and $N_{b,H}$ from the serving eNB 103. Alternatively, the UE 116 receives NumVCSIRSPorts and NumHCSIRSPorts from the serving eNB 103 where NumVCSIRSPorts and NumHCSIRSPorts are the number of precoded CSI-RS ports in the vertical and the horizontal dimensions, respectively. These two parameter names are exemplary and illustrative of the concept. The total number of CSI-RS ports is the product of the two values. The values of these parameters, along with horizontal and vertical transmission ranks, determine a configuration of vertical and horizontal open-loop transmission modules. This information is utilized by the UE 116 for the CSI calculation.

A more general form of precoding operation is described as follows. An overall transmit (TX) precoder associated with each of the UEs (such as UE 116) is written as follows:

$$W = W_L V$$

$$y = Wx = W_L Vx = W_L z \qquad (10)$$

Here y and x denote precoded and non-precoded signal vectors, respectively. Assuming that a total number of TX antennas at an eNB 103 is $N_{TX}$ and a transmission rank (such as a number of transmission layers) is $N_L$, the size of a precoder matrix W is $N_{TX} \times N_L$. For dual-polarized array with $N_r$ rows and $N_c$ columns, the number of TX antennas is $N_{TX} = 2N_r N_c$. This precoder is either a channel representation (such as channel quantization of $H^{(q,f)}$, that is, the channel associated with the q-th RX antenna and the f-th subband) or a precoder/beamformer representation (such as a vector or matrix corresponding to eigenvector(s)). In the second case, the precoder is computed either assuming a single-user (SU) or a multi-user (MU) transmission hypothesis. Here $W_L$ denotes the long-term component associated with the aforementioned AoD profile, which includes a subset of basis vectors/functions and V, which is the short-term component associated with a linear transformation of the long-term component (such as a linear combination of the subset of basis functions/vectors). The number of columns of $W_L$, which is also the number of rows of V corresponds to the size of basis subset which is denoted as $N_B$. $W_L$ and V are UE-specific precoders.

In certain embodiments, $W_L$ is configured as a cell-specific or a group-specific precoder. The group-specific precoding refers to using the same precoding matrix $W_L$ for a group of UEs. In this case, all UEs associated with an eNB 103 are partitioned into several groups, with each group associated with a possibly distinct precoding matrix $W_L$.

For the long-term precoder component $W_L$ in equation (10), wideband precoding (such as the same precoder for all subbands) is sufficient. The short-term component V, on the other hand, offers benefit from subband precoding. However, it is noted that a subband precoding for $W_L$ is needed for higher frequency bands such as a millimeter wave (mm Wave), where much wider system bandwidth is used.

For a 2D rectangular array, a Kronecker structure is used for precoder design. In that case, equation (10) is written in two equivalent forms:

$$W = (W_{L,v} V_v) \otimes (W_{L,h} V_h) = (W_{L,v} \otimes W_{L,h})(V_v \otimes V_h) \qquad (11)$$

Here, h and v denote a horizontal and a vertical dimension. The first form implies that the overall precoder W is decomposed into a vertical and a horizontal component via Kronecker product. The second form implies that either a long-term or a short-term precoder is decomposed into the vertical and the horizontal component via Kronecker product. For each of the dimensions (such as horizontal or vertical), the Rel.12 LTE precoding codebooks for 2, 4, and 8 antenna ports are reused. Here, PMI report is derived from two antenna ports, four antenna ports, or eight antenna ports. The 8-ports and the 4-ports antenna in Rel.12 LTE codebooks are designed based on a dual-stage structure where the PMI associated with an index $i_1$ is associated with either $W_{L,v}$ or $W_{L,h}$. Essentially, the codebook index $i_1$ points to a subset of precoding vectors (such as beams) from which one vector is selected via an index $i_2$ along with co-phasing operations.

Equation (10) facilitates a flexible and all-encompassing framework for FD-MIMO, which accommodates deployment scenarios assuming a short-term precoding matrix V is fed back. In certain embodiments, there is no feedback of $W_L$ and a CSI-RS is precoded with $W_L$. A UE recommendation of precoder V is chosen transparent to $W_L$. In these embodiments, eNB 103 is able to estimate/measure a DL AoD profile from at least one UL signal. Furthermore, these embodiments are used for FDD when UL-DL duplex distance is sufficiently small such that UL-DL long-term reciprocity holds.

In certain embodiments, there is no feedback of $W_L$ and a CSI-RS is not precoded with $W_L$ but eNB 103 configures UE 116 with a set of basis vectors that represent $W_L$. Thus, the UE recommendation of precoder V is chosen conditioned upon $W_L$ configured by the eNB 103. In these embodiments, the eNB 103 is able to estimate/measure a DL AoD profile from at least one UL signal. Furthermore, these embodiments are used for FDD when UL-DL duplex distance is sufficiently small such that UL-DL long-term reciprocity holds.

In certain embodiments, UE 116 feeds back $W_L$ and a CSI-RS is not precoded with $W_L$. Thus the UE recommendation of precoder V is chosen conditioned upon $W_L$ which is computed/chosen by the UE. These embodiments are relevant when such long-term reciprocity is not assumed.

In certain embodiments, UE 116 feeds back $W_L$ and a CSI-RS is precoded with $W_L$ that is a subset of the precoding applied to the CSI-RS. These embodiments are relevant when such long-term reciprocity is not assumed.

Each embodiment is self-contained but more than one of the schemes below is used together for a given UE.

FIG. 20 illustrates an example block diagram of a data path processing circuitry 2000 associated with the above scheme at an eNB according to this disclosure. The embodiment of the data path processing circuitry 2000 shown in FIG. 20 is for illustration only. Other embodiments could be used without departing from the scope of the present disclosure. The data path processing circuitry 2000 can be the same as, or similar to, the controller/processor 225 and can include one or more processors or other processing devices that control the overall operation of the eNB 103.

An uplink reception circuit 2005 performs an uplink reception. Depending on whether UL-DL long-term reciprocity is utilized at the eNB 103, the uplink reception circuit 2005 either performs the following for a UE 116, denoted as a UE-n in FIG. 20. The uplink reception circuit 2005 measures a DL AoD profile from an UL AoA profile derived from at least one UL signal, or decodes the UE CSI feedback. Using one or potentially both of these two means, vector circuit 2010 selects a subset of vectors for the UE-n within a fixed predetermined master-set. This subset selection serves as an input to a first precoder to form a long-term precoder $W_L$ where the output of a unit 2004 is precoded with $W_L$. While the first precoder 2015 performs the long-term precoding on the data, which maps the $N_B$ streams into $N_{TX}$ streams, the second precoder 2020 performs a short-term and potentially sub-band precoding by mapping $N_L$ data streams into $N_B$ data streams. For beamforming applications, a number of data streams (such as layers) $N_L$ is typically 1 or 2. Essentially, the second precoder 2020 performs a fast adaptive precoding based on the CSI feedback, where a PMI is included, from the UE-n prior to the long-term precoding in the first precoder 2015. Once the data is precoded in the second precoder 2020 and the first precoder 2015, it is multiplexed with other signals by a multiplexor 2025 before mapping them to the $N_{TX}$ available TXRUs (such as physical antennas).

These embodiments are intended for adaptive beamforming operation, which implies a closed-loop mechanism for FDD. Here, adaptive refers to the ability or tendency of the eNB 103 to change precoding weights for a given UE (such as UE 116) from a subframe to a subframe. Hence, it requires 'fast' feedback from the UE 116 to the eNB 103. In these embodiments, this is reflected in the second precoder component V (such as $V_v$ and $V_h$). In certain embodiments, such fast precoder adaptation is neither necessary nor beneficial (such as for UEs with high mobility, channels with strong line-of-sight (LoS) components, UL feedback resource limitation, lack of accurate CSI estimation at the eNB 103). Hence, it is desirable to support at least one scheme which utilizes no more than slow precoder adaptation. It is even more preferred if the scheme operates in an open-loop manner, that is, in the absence of feedback.

In certain embodiments, a two-stage UE-specific precoding scheme in the equation (7) is adapted for an open-loop transmission. A long-term (such as possibly wideband) component $W_L$ in the equation (7) is determined at an eNB based on some measurements at the eNB (such as measuring at least one UL signal), some UE feedbacks or a combination of thereof. If the UE feedbacks are used for $W_L$, it is a long-term (such as slow) feedback. Interpretation of such a PMI (PMIs) is dependent on transmission modes. If Rel.12 LTE is used, a periodic CSI reporting on a PUCCH is used to report a PMI associated with $W_L$. It is expected to share a comparable periodicity as an RI feedback. In one embodiment, eNB 103 triggers an aperiodic CSI reporting from a UE by utilizing (such as aperiodic CSI reporting on PUSCH mode 2-1 or 3-1 which supports wideband PMI, i.e. PMI that represents the entire system bandwidth). In such embodiments, $W_L$ provides a UE-specific subset of (such as slowly adapted) basis vectors. Furthermore, Rel.12 LTE codebooks that are designed with a dual-stage structure allow an association between $W_L$ and $i_1$.

A short-term component V in the equation (10) operates in an open-loop manner and hence does not require a UE feedback (such as therefore non-adaptive). For the open-loop operation, the precoding matrix V is predetermined and facilitates at least one open-loop transmission scheme.

In certain embodiments, restricting an open-loop operation to rank-1 and 2 (such as although the proposed solution is easily extended to a higher-rank transmission), several open-loop schemes are implemented through the choice of V, which entails performing to the open-loop transmit diversity (such as either rank-1 or rank-2) in a beam space constructed by $W_L$ precoding.

Figure 21:
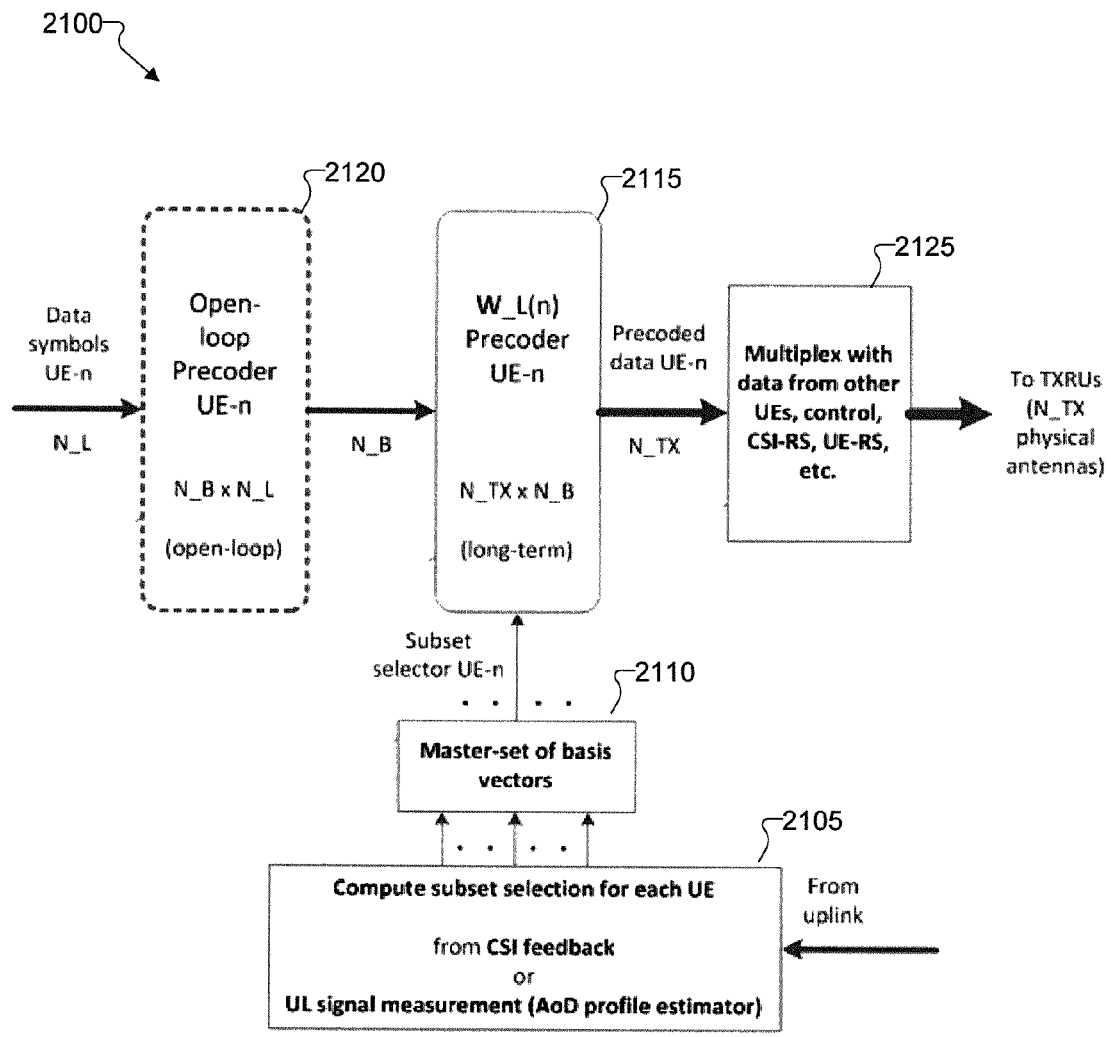
FIG. 21 illustrates an example block diagram of a data path in an open-loop transmission according to embodiments of the present disclosure.

FIG. 21 illustrates an example block diagram of a data path processing circuitry 2100 for supporting an open-loop transmission at an eNB 103 according to this disclosure. The embodiment of the data path processing circuitry 2100 shown in FIG. 21 is for illustration only. Other embodiments could be used without departing from the scope of the present disclosure. The data path processing circuitry 2100 can be the same as, or similar to, the controller/processor 225 and can include one or more processors or other processing devices that control the overall operation of the eNB 103.

In the example shown in FIG. 21, the data path processing circuitry 2100 includes an uplink reception circuit 2105, a vector circuit 2110, a first precoder 2115 and a second precoder 2120. The second precoder 2120 performs operations needed for the open-loop transmission which does not utilize any CSI feedback, nor does it utilize any estimated DL AoD profile from any UL signal. As such, the second precoder 2120 is not dependent on an uplink reception circuit 2105.

For simplicity of notation, all the schemes below describe precoding operation along one of the dimensions (such as either horizontal or vertical). Therefore, a model is readily applicable for a 1D array. For a 2D array, as evident from the equation (11), a horizontal (such as azimuth) and a vertical (such as elevation) dimension are separable. A total number of precoders (or such as transmit diversity scheme) for the 2D array including the horizontal and the vertical, then, is constructed by taking a Kronecker product of the two precoders (such as horizontal and vertical). In certain embodiments, a scheme applied to a horizontal and a vertical dimension is the same scheme. In certain embodiments, the scheme applied to a horizontal and a vertical dimension is not the same.

In certain embodiments (such as scheme 1), given $N_B$ beams generated by a $N_B$ basis vectors in $W_L$, eNB 103 performs beam cycling across time (such as across OFDM symbols, slots, or subframes) or frequency (such as across sub-carriers/REs, PRBs, or sub-bands) to obtain an open-loop diversity gain. Here, a cycling is performed for each of supported transmission layers. A cycling pattern is based on a predetermined sequence. For example, if the cycling is performed in a frequency domain across sub-carriers or REs, the cycling pattern and an associated V matrix are used which turns out to be a length-$N_B$ column vector in this case.

$$I_{l,k}=\text{mod}(k+\Delta_l,N_B), k=0,1,\ldots$$

$$V_{l,k}=e_{I_{l,k}}=[0 \ldots 010 \ldots 0]^T \text{ (only the } I_{l,k}\text{-th element is non-zero)}$$

$$z_{l,k}=V_{l,k}x_{l,k} \quad (12A)$$

where $I_{l,k}$ denotes precoding a vector index for a transmission layer 1 and a sub-carrier k while $\Delta_l$ denotes a layer-specific index shift. The same equation is applied for a cycling across physical resource blocks (PRBs) or sub-bands where an index k is associated with a PRB or a sub-band. Once $V_{l,k}$ is applied to an input data symbols x, a long-term precoding component is applied to an output z.

In certain embodiments, a scheme for $V_{l,k}$ is constructed by utilizing a precoder codebook and a cycling across at least a subset of precoders within a codebook for a given combination of layer and sub-carrier indices (l, k). In these embodiments, $V_{l,k}$ forms a linear combination of $N_B$ column vectors of $W_L$ rather than selecting one at a time as done in the equation (12A). For instance, for $N_B=2$, one-layer codebook (such as REL-12 LTE) having a size-4 is used. In this case, $V_{l,k}$ cycles across precoder set $$\left\{\frac{1}{\sqrt{2}}\begin{bmatrix}1\\1\end{bmatrix}, \frac{1}{\sqrt{2}}\begin{bmatrix}1\\-1\end{bmatrix}, \frac{1}{\sqrt{2}}\begin{bmatrix}1\\j\end{bmatrix}, \frac{1}{\sqrt{2}}\begin{bmatrix}1\\-j\end{bmatrix}\right\}$$

based on a certain predetermined cycling pattern such as $$I_{l,k}=\text{mod}(k+\Delta_l,4), k=0,1,\ldots \quad (12B)$$

For $N_B=4$, the one-layer codebook having a size-16 is used. In this case, $V_{l,k}$ cycles across the size-16 codebook or a subset of this codebook, for example, size-4 based on a certain predetermined cycling pattern such as $$I_{l,k}=\text{mod}(k+\Delta_l,N_{subset}), k=0,1,\ldots \quad (12C)$$

In case of transmissions with multiple layers, different cycling patterns are used for different layers to avoid the use of the same precoder for a given time. For example, a layer-specific index shift $\Delta_l$ is used. In certain embodiments, any other one-layer codebook is used. The resulting $N_B \times N_L$ precoding matrix aggregated across $N_L$ layers is given:

$$V_k=[V_{0,k}V_{1,k}\ldots V_{N_L-1,k}] \quad (12D)$$

In case of frequency domain cycling (such as also termed as frequency-switched transmit diversity, FSTD) this scheme is implemented as a standard-transparent feature depending on the granularity of the cycling. If the cycling is performed across PRBs or sub-bands (such as one sub-band including multiple PRBs), the same precoding vector is applied across all the sub-carriers within one PRB. This is because the associated UE-specific RS (such as within each PRB) is precoded with the same precoding vector as the data symbols. Thus, this scheme is used as a standard-transparent feature. However, if the cycling is performed across sub-carriers, this scheme is not used as a standard-transparent feature and explicitly configured by the eNB 103 for a given UE 116. This is because the sub-carriers of UE-specific RS is precoded differently from the data REs. In this case, the associated UE-specific RS is precoded with the same $W_L$ as data signals but not with $V_{l,k}$. That is, a set of $N_B$-port UE-specific RSs is utilized and precoded along with the data across $N_{TX}$ physical antennas (such as TXRUs). The precoder cycling is applied across these $N_B$ (such as virtual) streams. In one embodiment, a configuration is performed by a higher-layer RRC signaling as a transmission mode. Accordingly, an open-loop transmission is semi-statically configured and differentiated from a closed-loop transmission. In another embodiment, a configuration is performed by a PDCCH included in DL grant as a DCI field. Accordingly, an open-loop transmission is treated as a precoding type that is indicated in one of the fields in the DCI field. For example, a DCI format is derived from one of the existing DCI formats in Rel.12 LTE (such as DCI format 2A/2B) where precoding information field is utilized to activate the open-loop transmission. In this case, a UE-specific RS is not precoded with $V_{l,k}$ (such as although it is precoded with $W_L$). Once the UE 116 estimates a channel from the UE-specific RS (such as being demodulation), the UE infers the associated channel estimates with $V_{l,k}$ from the estimates obtained directly from the UE-specific RS.

Figure 22:
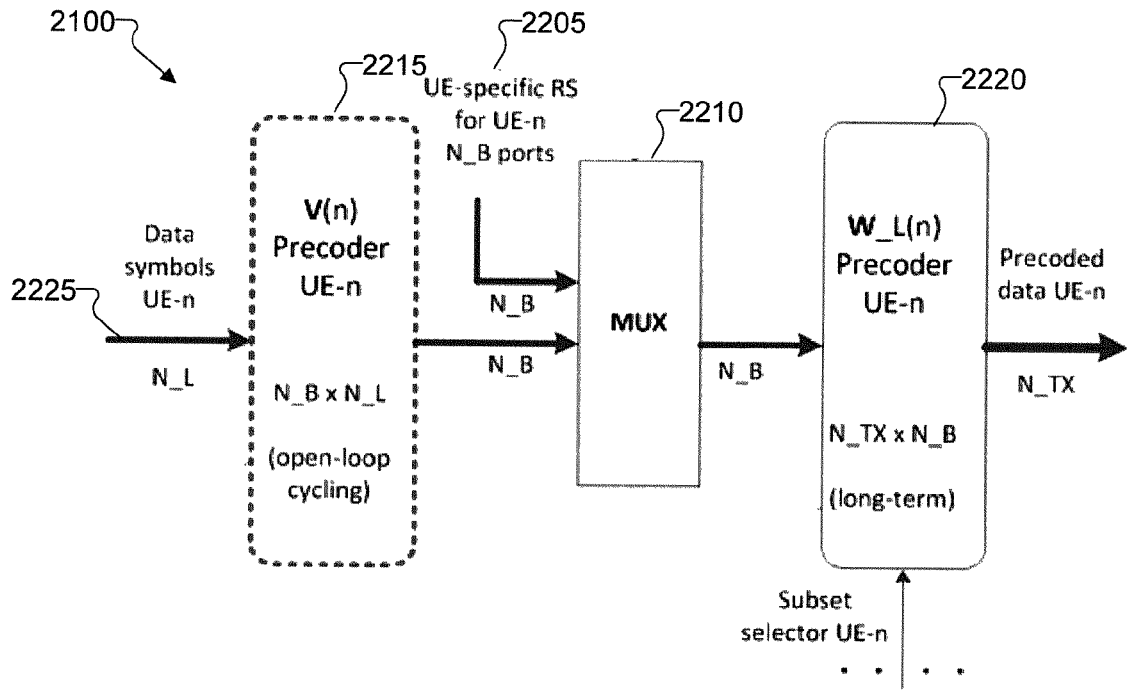
FIG. 22 illustrates another example block diagram of a data path in an open-loop transmission according to embodiments of the present disclosure.

FIG. 22 illustrates another example block diagram of a data path processing circuitry 2200 in an open-loop transmission according to this disclosure. The embodiment of the data path processing circuitry 2200 shown in FIG. 22 is for illustration only. Other embodiments could be used without departing from the scope of the present disclosure. The data path processing circuitry 2200 can be the same as, or similar to, the controller/processor 225 and can include one or more processors or other processing devices that control the overall operation of the eNB 103.

In the example shown in FIG. 22, the data path processing circuitry 2200 includes a connection to UE-specific RS ports 2205, a multiplexor 2210, first precoder 2215 and second precoder 2220. When a precoder cycling is performed across sub-carriers, the scheme 1 generally requires UE-specific RS ports 2205, which are multiplexed by multiplexor 2210 and share the same second precoder $W_L$ 2220 with data. In one embodiment, the same scheme is performed across OFDM symbols. In this case, the associated UE-specific RS 2205 is not precoded with the same precoding vector as data signals 2225, which are precoded via the first precoder 2215. This is because not all OFDM symbols contain UE-specific RS symbols.

In certain embodiments (such as scheme 2), given $N_B$ beams generated by $N_B$ basis vectors in $W_L$, eNB 103 performs a block coding across beams and time or frequency domains. A time or a space-time granularity is similar to the scheme 1. Here, various space-time/frequency block codes or linear dispersion codes are available to choose from. For example, for $N_B=2$, Alamouti code is applied either in time or frequency domain (such as in LTE Rel.12 LTE). Similarly, for $N_B=4$, a space-frequency block coding-frequency shifted transmit diversity (SFBC-FSTD) is applied either in time or frequency domain. With the space time/frequency block coding (ST/FBC), multiple blocks of data (such as instead of a single block in the scheme 1) are processed together where this collection of data blocks include multiple symbols that are mapped into multiple sub-carriers (REs) or multiple OFDM symbols depending on whether SFBC or STBC is employed. For example, for $N_B=2$, Alamouti code is utilized in frequency domain (such as SFBC) as follows:

$$\begin{bmatrix} Z_{l,2k} \\ Z_{l,2k+1} \end{bmatrix} = \frac{1}{\sqrt{2}} \begin{bmatrix} 1 & 0 & j & 0 \\ 0 & -1 & 0 & j \\ 0 & 1 & 0 & j \\ 1 & 0 & -j & 0 \end{bmatrix} \begin{bmatrix} \text{Re}(x_{l,k}) \\ \text{Im}(x_{l,k}) \end{bmatrix} \quad (13)$$

For $N_B=4$, SFBC-FSTD is utilized in frequency domain as follows:

$$\begin{bmatrix} Z_{l,4k} \\ Z_{l,4k+1} \\ Z_{l,4k+2} \\ Z_{l,4k+3} \end{bmatrix} = \frac{1}{\sqrt{2}} \begin{bmatrix} 1 & 0 & 0 & 0 & j & 0 & 0 & 0 \\ 0 & 0 & 0 & 0 & 0 & 0 & 0 & 0 \\ 0 & -1 & 0 & 0 & 0 & j & 0 & 0 \\ 1 & 0 & 0 & 0 & 0 & 0 & 0 & 0 \\ 0 & 1 & 0 & 0 & 0 & j & 0 & 0 \\ 0 & 0 & 0 & 0 & 0 & 0 & 0 & 0 \\ 1 & 0 & 0 & 0 & -j & 0 & 0 & 0 \\ 0 & 0 & 0 & 0 & 0 & 0 & 0 & 0 \\ 0 & 0 & 0 & 0 & 0 & 0 & 0 & 0 \\ 0 & 0 & 1 & 0 & 0 & 0 & j & 0 \\ 0 & 0 & 0 & 0 & 0 & 0 & 0 & 0 \\ 0 & 0 & 0 & -1 & 0 & 0 & 0 & j \\ 0 & 0 & 0 & 0 & 0 & 0 & 0 & 0 \\ 0 & 0 & 0 & 1 & 0 & 0 & 0 & j \\ 0 & 0 & 0 & 0 & 0 & 0 & 0 & 0 \\ 0 & 0 & 1 & 0 & 0 & 0 & -j & 0 \end{bmatrix} \begin{bmatrix} \text{Re}(x_{l,k}) \\ \text{Im}(x_{l,k}) \end{bmatrix} \quad (14)$$

An output $\{z_{l,k}\}$ is then precoded with the long-teen precoding component $W_L$. In this case, an open-loop transmit diversity operation is not directly expressed in the form of equations (12A-12C) since it involves a space-time block coding operation.

ST/FBC is not implemented as a standard-transparent feature and explicitly configured by the eNB for a given UE. It requires that a UE-specific RS is not precoded with $V_{l,k}$. That is, a set of $N_B$-port UE-specific RSs is utilized and precoded along with the data across $N_{TX}$ physical antennas (such as TXRUs). Multiplexing data and UE-specific RS are performed in a similar manner to the scheme 1. A precoder cycling is applied across these $N_B$ (such as virtual) streams. In one embodiment, a configuration is performed by a higher-layer RRC signaling as a transmission mode. Accordingly, an open-loop transmission is semi-statically configured and differentiated from a closed-loop transmission. In another embodiment, a configuration is performed by a PDCCH included in DL grant as a DCI field. Accordingly, an open-loop transmission is treated as a precoding type that is indicated in one of the fields in the DCI field. For example, a DCI format is derived from one of the existing DCI formats in Rel.12 LTE (such as DCI format 2A/2B) where precoding information field is utilized to activate the open-loop transmission.

In the scheme 1 and the scheme 2, $W_L$ is assumed to be a UE-specific or at most a group-specific. In certain embodiments (such as scheme 3), $W_L$ is assumed to be a cell-specific and wideband (such as fixed). Here an additional virtualization P is added. Given $N_B$ beams generated by an $N_B$ basis vectors in $W_L$, eNB 103 firstly performs beam virtualization across $N_B$ basis vectors, i.e.

$$W'_L = W_L P \quad (15)$$

where $P \in \mathbb{C}^{N_B \times N_P}$ is a virtualization matrix that produces a composite beam, which is broader or narrower than the beams specified by the $N_B$ basis vectors in $W_L$. Then, the eNB 103 applies the scheme 1 and scheme 2 by using the $N_P$ basis vectors in $W'_L$ basis vectors. The virtualization precoder P is a UE-specific and provides some additional benefits for an open loop scheme. For example, if the channel associated with an UE 116 varies over a wide range across the basis vectors in $W_L$, the P is designed such that the $N_P$ beams in $W'_L$ is wider than that in $W_L$. Alternatively, if the channel associated with the UE 116 varies overall a small range across, the P is designed such that the $N_P$ beams in $W'_L$ is narrower than that in $W_L$ and thus provides a larger long-term beamforming gain. While this scheme is considered as a special case of the equation (10), it allows some additional flexibilities especially in allowing a long-term and a subband precoding with P.

In certain embodiments (such as scheme 4), given $N_B$ beams generated by an $N_B$ basis vectors in a long-term precoder $W_L$, eNB 103 performs a cyclic delay diversity (CDD) operation across time (such as across OFDM symbols, slots, or subframes) or frequency (such as across sub-carriers/REs, PRBs, or sub-bands) to obtain an open-loop diversity gain. The CDD is typically used to increase frequency selectivity of the channel. For multi-layer transmission, the CDD (such as especially with large cyclic delay parameter) also increase system robustness against CSI impairments (such as flashlight effect on inter-cell interference, CSI feedback delay at moderate to high mobility). For $N_L=1$, the CDD is performed by introducing a phase ramp across the $N_B$ beams in frequency domain. The precoder $V_k$ for sub-carrier k is be written as follows:

$$V_k = \frac{1}{\sqrt{N_B}} \begin{bmatrix} 1 \\ e^{-j\frac{2\pi}{N_B}\theta k} \\ \vdots \\ e^{-j\frac{2\pi}{N_B}\theta(N_B-1)k} \end{bmatrix}, k = 0, 1, \ldots \quad (16A)$$

Here θ is a cyclic delay parameter that results in a cyclic delay of θ in time domain which is fixed or varied based on measured channel condition. Since the CDD only introduces additional cyclic-delayed copies of the channel impulse response, the effective channel seen by UE 116 is $\Sigma_{p=1}^{N_B} h_p$ ((i−pθ)(mod $N_B$)). In this case, only one-port UE-specific RS is needed and multiplexed with data prior to perform a precoding with $V_k$. Accordingly, the CDD is implemented as a standard-transparent scheme, at least for $N_L=1$. In general, for $N_L>1$, the CDD is performed across the $N_B$ beams in frequency domain. In that case, the precoder $V_k$ follows a similar format as:

$$V_k = C_k D_k U \quad (16B)$$

The $N_B \times N_L$ matrix $C_k$ maps the $N_B$ beams onto $N_L$ layers. This component is fixed or varied across sub-carriers. This component allows the scheme 1 (such as precoder cycling) to be used together with a layer permutation/shifting. This combination is used in Rel.12 LTE CRS-based open-loop spatial multiplexing without the use of $W_L$. The matrix $D_k$, which introduces a cyclic delay across layers, and U (such as additional fixed precoding) are chosen from Rel-12 LTE. In one embodiment, U is not required and is ignored.

Since layer permutation occurs across sub-carriers, this scheme requires more than one UE-specific RS ports and is not transparent to the UEs. For example, if $C_k$ is fixed across sub-carriers, $N_L$ UE-specific RS ports are needed. In another example, if $C_k$ is varied across sub-carriers (such as using precoder cycling), $N_B$ UE-specific RS ports are needed. In one embodiment, CDD is used for $N_L>1$ where CDD is performed across $N_B$ beams in frequency domain for each transmission layer. Then precoder cycling (such as the scheme 1) is applied in conjunction with CDD for each layer. Different cycling patterns are used for different layers to avoid inter-layer interference.

$$V_{l,k} = \frac{1}{\sqrt{N_B}} \begin{bmatrix} 1 & 0 & 0 & 0 \\ 0 & e^{-j\frac{2\pi}{N_B}\theta k} & 0 & 0 \\ 0 & 0 & \ddots & 0 \\ 0 & 0 & 0 & e^{-j\frac{2\pi}{N_B}\theta(N_B-1)k} \end{bmatrix} p_{l,k}, k=0,1,\ldots \quad (16C)$$

$$\begin{aligned} V_k &= [\,V_{0,k} \quad V_{1,k} \quad \cdots \quad V_{N_L-1,k}\,] \\ &= \frac{1}{\sqrt{N_B}} \begin{bmatrix} 1 & 0 & 0 & 0 \\ 0 & e^{-j\frac{2\pi}{N_B}\theta k} & 0 & 0 \\ 0 & 0 & \ddots & 0 \\ 0 & 0 & 0 & e^{-j\frac{2\pi}{N_B}\theta(N_B-1)k} \end{bmatrix} [\,p_{0,k} \quad p_{1,k} \quad \cdots \quad p_{N_L-1,k}\,] \\ &= \frac{1}{\sqrt{N_B}} \begin{bmatrix} 1 & 0 & 0 & 0 \\ 0 & e^{-j\frac{2\pi}{N_B}\theta k} & 0 & 0 \\ 0 & 0 & \ddots & 0 \\ 0 & 0 & 0 & e^{-j\frac{2\pi}{N_B}\theta(N_B-1)k} \end{bmatrix} P_k \end{aligned} \quad (16D)$$

A length-$N_B$ precoding vector $p_{l,k}$ performs precoder cycling across the vectors within a subset or an entirety of a rank-1 codebook (such as $N_B=2$/size-4 or $N_B=4$/size-16 in Rel-12 LTE). The precoding vector cycles across a (sub)set of precoding vectors in a manner analogous to equation (12C). Here, different layers utilize different cycling patterns. For example, in equation (12C), a layer-specific cycling index is used. Alternatively, an equivalent formulation in equation (16D) suggests that a precoder cycling is performed across a (sub)set of $N_L$-layer precoding matrices. That is, the $N_B \times N_L$ matrix $P_k$ cycles across the matrices within a subset or an entirety of a rank-$N_L$ codebook. For example, Rel.12 LTE codebooks having $N_B=2$/size-4) or $N_B=4$/size-16) are utilized for this purpose.

Figure 23:
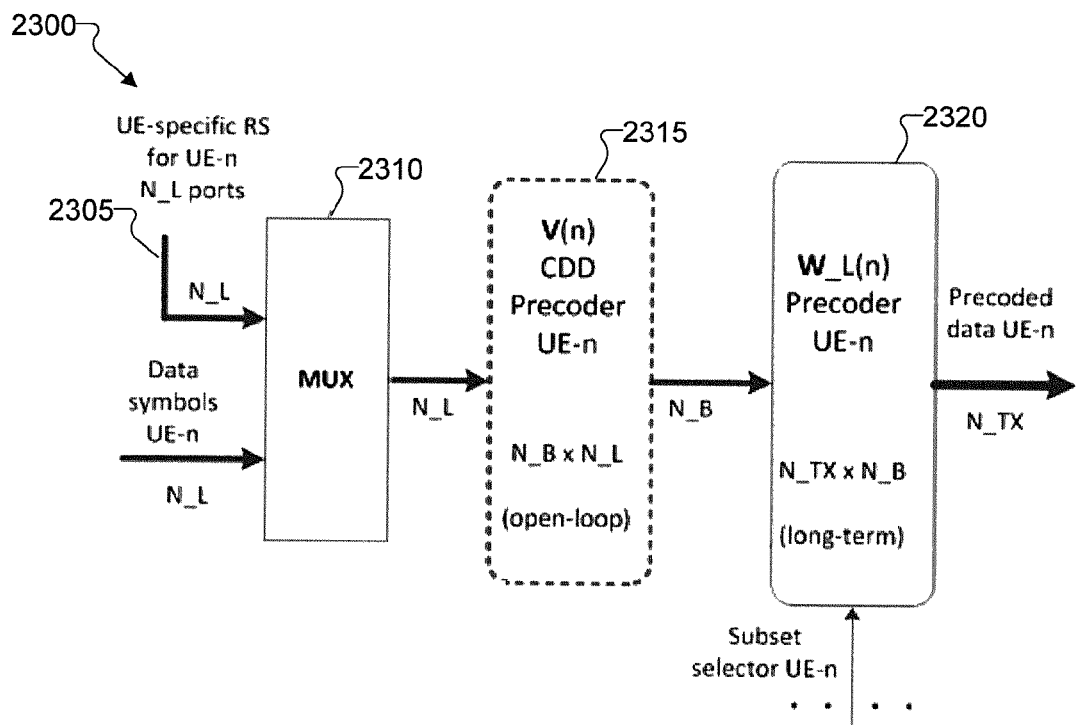
FIG. 23 illustrates an example block diagram of a long-term precoding in conjunction with a cyclic delay diversity (CDD) according to embodiments of the present disclosure.

FIG. 23 illustrates an example block diagram for processing circuitry 2300 of a long-term precoding in conjunction with cyclic delay diversity (CDD) according to this disclosure. The embodiment of the processing circuitry 2300 shown in FIG. 23 is for illustration only. Other embodiments could be used without departing from the scope of the present disclosure. The processing circuitry 2300 can be the same as, or similar to, the controller/processor 225 and can include one or more processors or other processing devices that control the overall operation of the eNB 103.

In the example shown in FIG. 23, the processing circuitry 2300 includes a connection to UE-specific RS ports 2205, multiplexor 2310, a first precoder 2315 and a long term precoder 2320. A switching between a closed loop and an open loop is primarily related to configure a UE-n for V. When the UE 116 is configured for the closed-loop transmission, V is adapted at the eNB 103 based on a CSI feedback from the UE 116 (such as in Rel.12, PMI along with RI is used to indicate a recommended precoder for UE-n). When the UE 116 is configured for the open-loop transmission, V is predetermined and non-adaptive. The long-term precoder $W_L$ 2320 is made common between the closed loop and the open loop transmissions.

In one embodiment, if an open-loop transmission scheme is transparent to UE 116 (such as standard-transparent) for configuring for a UE 116, there is no need for explicit configuration. In another embodiment (such as semi-static), eNB 103 configures a UE 116 via higher-layer signaling (such as RRC) whether UE 116 assumes an open-loop or a closed-loop DL transmission. In this embodiment, two transmission schemes (such open-loop and closed-loop schemes) are associated with one transmission mode (such as in Rel-12 LTE). In another embodiment, a semi-static switching (such as a semi-static V-precoder) is configured for a UE-n under the same transmission mode. In yet another embodiment (such as dynamic), a switching between an open-loop and a closed-loop is performed through a DCI field in a DL grant which is used to indicate an eNB-configured transmission mode.

Regardless whether the open-loop transmission scheme is transparent to the UEs or not, the issue of CSI feedback configuration is still relevant in relation to this. For instance, eNB 103 configures the UE 116 whether or not to report PMI associated with V (such as short-term precoding). When the eNB 103 decides to perform the open-loop transmission to the UE 116, eNB 103 turns off such PMI report while still maintaining PMI report associated with $W_L$ or RI feedback. If an explicit transmission scheme configuration (such as in terms of transmission mode) is required, it is possible to link a CSI feedback configuration with a transmission mode configuration. For instance, if UE 116 is configured for the open-loop transmission mode, the UE 116 does not report PMI associated with V (such as short-term precoding). In this case, the CSI feedback overhead is reduced accordingly.

A closed-loop transmission performs a short-term precoding adaptation which facilitates MU-MIMO operation. Transmissions aimed at different UEs are multiplexed via different spatial beams. In case of the disclosed open-loop or semi closed-loop transmission, MU-MIMO operation is performed similarly. Thus, different UEs are multiplexed via different spatial beams. However, unlike closed-loop transmission which primarily relies on a short-term CSI (such as CQI, PMI, and RI) feedback, the disclosed open-loop or semi closed-loop scheme performs MU-MIMO. In one embodiment, either a long-term UE-specific or a group-specific precoding $W_L$ allows slow adaptation, which is leveraged for MU-MIMO. In another embodiment, for UEs sharing the same $W_L$, overlapping column vectors, or beams of $W_L$ among several UEs, MU-MIMO is still performed across such UEs by choosing different open-loop parameters for different UEs. In one example, for the scheme 1 (such as precoder cycling), different values of the index shift parameter $\Delta_l$ are assigned to different UEs to avoid using the same precoder or beam at a given sub-carrier or subframe. In reference to equations (12A), (12B), and (12C), a UE-specific index $I_{l,k}^{(n)}$ and, therefore, an index shift $\Delta_l^{(n)}$ parameter are used for this purpose. This results in a UE-specific precoding matrix $V_{l,k}^{(n)}$ for a UE 116. In another example, for the scheme 4 (such as CDD), different values of a phase shift (such as cyclic delay) parameter $\theta$ is assigned to different UEs. In reference to equations (16A) and (16B), a UE-specific phase shift parameter $\theta^{(n)}$ is used for this purpose, which results in a UE-specific) precoding matrix $V_{l,k}^{(n)}$ for a UE-n. In yet another example, if these schemes are not transparent to UEs, a UE-specific parameter is configured either via a higher-layer (RRC) signaling or as a part of DCI in DL grant.

When a rectangular array is used at eNB 103, a spatial channel includes azimuthal (such as horizontal, h) and elevation (such as vertical, v) dimensions. In practice, long-term channel characteristics are the same/similar or quite different for these different dimensions. When they are the same, the same different open-loop transmit diversity scheme is applied to both dimensions. On the other hand, when they are quite different, different open-loop transmit diversity schemes are applied for different dimensions. In one embodiment, a UE-n applies a fixed precoder for $W_{L,v}$, for instance, by utilizing the codebook subset restriction feature of Rel.12 LTE, while applying the scheme 1 (such as precoder cycling) or the scheme 2 (such as block coding) or the scheme 3 (such as CDD) across the beams associated with $W_{L,h}$. These are applicable when a UE-n does not exhibit much variation across a vertical and/or an elevation dimension and its vertical location is known with great confidence. In another example, different open-loop transmit diversity schemes are applied to both dimension when the channel characteristics pertaining horizontal and vertical dimensions are the opposite. In yet another embodiment, a UE-n apples the scheme 1 (such as precoder cycling) across the beams associated with one dimension (such as $W_{L,h}$) while applying the scheme 2 (such as block coding) across the beams associated with the other dimension (such as $W_{L,v}$). This is applicable when a spatial channel associated with a UE-n exhibits stronger line-of-sight (LOS)/specular component in the first dimension but stronger diffuse components in the second dimension. Yet a line of sight (LOS) component in the first dimension is not known with great confidence. In yet another embodiment, a UE-n applies the scheme 1 (such as precoder cycling) across the beams associated with one dimension (such as $W_{L,h}$) while applying the scheme 3 (such as CDD) across the beams associated with the other dimension (such as $W_{L,v}$). This is applicable when a spatial channel associated with a UE-n exhibits stronger line-of-sight (LOS)/specular component in the first dimension (such as albeit not known with great confidence). Meanwhile the second dimension lacks frequency selectivity. In yet another example, the scheme 1, the scheme 2, the scheme 3, or the scheme 4 is applicable in one dimension while applying a closed-loop scheme in the other dimension.

As illustrated above, the description of the schemes 1, 2, 3, and 4 are applied for one of the two dimensions (such as either horizontal or vertical). Assuming a 2D antenna array (such as $N_{TX}=N_{row}\times N_{col}$) as used in an FD-MIMO, two-component PMIs (such as h-PMI for horizontal dimension and v-PMI for vertical dimension) are determined and applicable as a CSI feedback. In one embodiment, an h-PMI includes a long-term (such as associated with $W_{L,h}$) and a short-term (such as associated with $V_h$) components. In another embodiment, a v-PMI includes a long-term (such as associated with $W_{L,v}$) and a short-term (such as associated with $V_v$) components. In such embodiments, the long-terra and the short-term components are defined according to the disclosed closed-loop and open-loop operations, respectively. In yet another embodiment, for an open-loop or a semi closed-loop operation, short-team PMIs are not required and turned off by an eNB.

In certain embodiments, assuming a 2D antenna array (such as $N_{TX}=N_{row}\times N_{col}$) as used in an FD-MIMO, two-component RI (such as h-RI associated with h-PMI and v-RI associated with v-PMI) are determined and applicable as a CSI feedback. In these embodiments, a total RI is the product of the h-RI and the v-RI.

In certain embodiments, assuming a 2D antenna array (such as $N_{TX}=N_{row}\times N_{col}$) as used in an FD-MIMO, a joint CQI is determined and applicable as a CSI feedback. In such embodiments, regardless of its definition (such as Rel.12 LTE recommended a spectral efficiency), the joint CQI is defined assuming a 2D PMI along with its 2D RI which is associated with the Kronecker product precoder given in (8).

Since different schemes are applied to different dimensions, an h-PMI and a v-PMI feedback are to be configured according to transmission schemes. Using the Rel.12 LTE precoding framework (such as dual-stage codebook with two indices: $i_1$ and $i_2$) for a 2D array FD-MIMO, the corresponding CSI feedback contains an RI (such as h-RI and v-RI), a PMI, a CQI (such as joint CQI is defined based on the RI and the PMI), or a combination of thereof. In one embodiment, a h-PMI is configured to be a long-term and a v-PMI is configured as a short-term (such as h-$i_1$, v-$i_1$, and v-$i_2$). In another embodiment, a v-PMI is configured as a long-term and a h-PMI is configured as a short-term (such as v-$i_1$, h-$i_1$, and h-$i_2$). In yet another embodiment, both an h-PMI and v-PMI are configured as a long-term (such as h-$i_1$ and v-$i_1$). In yet another embodiment, both an h-PMI and a v-PMI are configured as a short-term (such as h-$i_1$, v-$i_1$, h-$i_2$, and v-$i_2$). In such embodiments, it is beneficial to define a new sub-mode of mode 1-1 periodic CSI reporting on PUCCH (such as in Rel-12 LTE). Long-term PMI components (h-$i_1$ and v-$i_1$) are expected to share a comparable or the same periodicity as an RI feedback. Particularly in a mode 1-1 submode 1, an $i_1$ is reported together (such as jointly encoded) with the RI with a different periodicity (such as reporting interval) from CQI+$i_2$ where CQI and $i_2$ are reported together. However, an $i_2$ (such as short-term precoding) is not needed for this purpose. Therefore, in certain embodiments, if an h-PMI is configured as a long-term and a v-PMI is configured as a short-term, report a PUCCH reporting type 4b (such as wideband joint h-v CQI, v-$i_2$). In another embodiment, if an h-PMI is configured as a long-term and a v-PMI is configured as a short-term, report a PUCCH reporting type 5a (such as h-RI and h-$i_1$, and v-RI and v-$i_1$). These two couples are reported together with one CSI resource or in parallel with two CSI resources.

In certain embodiments, if a v-PMI is configured as a long-term and h-PMI is configured as a short-term, report a PUCCH reporting type 4c (such as wideband joint h-v CQI, h-$i_2$). In one embodiment, if a v-PMI is configured as a long-term and h-PMI is configured as a short-term, report a PUCCH reporting type 5a (such as h-RI and h-$i_1$, and v-RI and v-$i_1$). These two couples are reported together with one CSI resource or in parallel with two CSI resources In certain embodiments, if both an h-PMI and a v-PMI are configured as a long-term, report a PUCCH reporting type 4a (such as wideband joint h-v CQI). In one embodiment, if both an h-PMI and a v-PMI are configured as a long-term, report a PUCCH reporting type 5a (such as h-RI and h-$i_1$, and v-RI and v-$i_1$). These two couples are reported together with one CSI resource or in parallel with two CSI resources.

In certain embodiments, a precoder cycling (such as the scheme 1) is combined with CDD (such as scheme 4). While the above embodiments assume a UE-specific or a group-specific long-term precoding $W_L$, which is slowly adapted based on a CSI feedback or an UL signal measurement (such as DL AoD profile), eNB 103 also uses a fixed cell-specific precoding matrix (such as fixed/static antenna virtualization). This includes a special case of no precoding at all (such as $W_L$ being a $N_{TX}\times N_{TX}$ identity matrix). An open-loop transmit diversity scheme is applied across the resulting fixed beams.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claims scope. The scope of patented subject matter is defined only by the claims. Moreover, none of the claims are intended to invoke 35 U.S.C. §112(f) unless the exact words "means for" are followed by a participle.

What is claimed is:

1. A method for operating a user equipment (UE), the method comprising:
   determining a precoding matrix indicator (PMI) associated with a first precoder index of a codebook determined by a first and a second precoder indices;
   calculating a channel quality indicator (CQI) in accordance with an open-loop operation and a precoding matrix associated with the PMI; and
   transmitting an uplink signal to a base station, wherein the uplink signal includes the PMI and the CQI, wherein the open-loop operation and the precoding matrix are associated with at least one of two dimensions of a two dimensional precoder.

2. The method of claim 1, wherein the CQI and the PMI are transmitted on two separate uplink subframes.

3. The method of claim 1, wherein an open-loop diversity operation maps one or a group of consecutive QAM symbols onto at least one of a plurality of columns of the precoding matrix including Discrete Fourier Transform (DFT) vectors for each of two polarization groups.

4. The method of claim 1, further comprising:
   determining a value of a reporting parameter associated with a value of N_B signal streams; and
   transmitting the value of the reporting parameter to the base station.

5. A user equipment (UE) comprising:
   a transceiver configured to receive at least one data stream including quadrature amplitude modulation (QAM) symbols; and
   at least one processor configured to:
      determine a precoding matrix indicator (PMI) associated with a first precoder index of a codebook determined by a first and a second precoder indices;
      calculate a channel quality indicator (CQI) in accordance with an open-loop operation and a precoding matrix associated with the PMI; and
      transmit an uplink signal to a base station, wherein the uplink signal includes the PMI and the CQI, wherein the open-loop operation and the precoding matrix are associated with at least one of two dimensions of a two dimensional precoder.

6. The UE of claim 5, wherein the CQI and the PMI are transmitted on two separate uplink subframes.

7. The UE of claim 5, wherein an open-loop diversity operation maps one or a group of consecutive QAM symbols onto a plurality of columns of the precoding matrix including Discrete Fourier Transform (DFT) vectors for each of two polarization groups.

8. The UE of claim 5, wherein the at least one processor is configured to determine a value of a reporting parameter associated with a number of N_B signal streams and transmit the value to the base station.

* * * * *

UNITED STATES PATENT AND TRADEMARK OFFICE
CERTIFICATE OF CORRECTION

PATENT NO. : 9,680,535 B2
APPLICATION NO. : 14/918335
DATED : June 13, 2017
INVENTOR(S) : Eko Onggosanusi et al.

Page 1 of 1

It is certified that error appears in the above-identified patent and that said Letters Patent is hereby corrected as shown below:

On the Title Page

At (72) Inventors: after Md. Saifur Rahman, Richardson, TX (US); delete "Young-Han Nam, Plano, TX (US);"

Signed and Sealed this
Seventeenth Day of October, 2017

Joseph Matal
*Performing the Functions and Duties of the*
*Under Secretary of Commerce for Intellectual Property and*
*Director of the United States Patent and Trademark Office*